United States Patent
Yamano

(10) Patent No.: US 7,961,410 B2
(45) Date of Patent: Jun. 14, 2011

(54) LENS BARREL AND CAMERA

(75) Inventor: Tohru Yamano, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 140 days.

(21) Appl. No.: 12/307,139

(22) PCT Filed: Jul. 3, 2007

(86) PCT No.: PCT/JP2007/063629
§ 371 (c)(1),
(2), (4) Date: Dec. 31, 2008

(87) PCT Pub. No.: WO2008/004689
PCT Pub. Date: Jan. 10, 2008

(65) Prior Publication Data
US 2009/0257137 A1  Oct. 15, 2009

(30) Foreign Application Priority Data
Jul. 4, 2006 (JP) ................................ 2006-184997

(51) Int. Cl.
*G02B 7/02* (2006.01)
(52) U.S. Cl. ......................... 359/817; 359/813; 359/822
(58) Field of Classification Search .................. 359/817
See application file for complete search history.

(56) References Cited

U.S. PATENT DOCUMENTS

| | | |
|---|---|---|
| 2003/0156832 A1 | 8/2003 | Nomura et al. |
| 2005/0207748 A1 * | 9/2005 | Ishizuka et al. ............... 396/349 |
| 2006/0018654 A1 | 1/2006 | Nuno et al. |
| 2006/0045517 A1 | 3/2006 | Kato |
| 2006/0268436 A1 * | 11/2006 | Sasaki ........................ 359/822 |

FOREIGN PATENT DOCUMENTS

| JP | 5 30821 | 4/1993 |
|---|---|---|
| JP | 2001 215388 | 8/2001 |
| JP | 2001 215389 | 8/2001 |
| JP | 2002 6198 | 1/2002 |
| JP | 2002 23039 | 1/2002 |
| JP | 2002 169070 | 6/2002 |
| JP | 2002 169078 | 6/2002 |
| JP | 2002 277711 | 9/2002 |
| JP | 2003 5009 | 1/2003 |

(Continued)

OTHER PUBLICATIONS

Vietnamese Office Action dated Sep. 29, 2010 in corresponding Vietnamese Application No. 1-2009-00009, filed on Jul. 3, 2007 (with English translation).

*Primary Examiner* — Jessica T Stultz
(74) *Attorney, Agent, or Firm* — Oblon, Spivak, McClelland, Maier & Neustadt, L.L.P.

(57) ABSTRACT

A collapsible lens barrel having a low-profile size and a camera applied with the collapsible lens barrel. The lens barrel includes a first retractable lens-retaining frame and a second retractable lens-retaining frame for retaining at least one of a plurality of lens groups and being retracted to a position outer than an inner radius of a movable lens cone in the collapsed state, respectively; and a first retractable lens-moving member and a second retractable lens-moving member. At least one of the first and second retractable lens-retaining frames is retained movable relative to the respective retractable lens-moving member along an optical axis direction in the collapsed state.

15 Claims, 14 Drawing Sheets

FOREIGN PATENT DOCUMENTS

| | | |
|---|---|---|
| JP | 2003 50342 | 2/2003 |
| JP | 2003 149723 | 5/2003 |
| JP | 3415540 | 6/2003 |
| JP | 2003 255212 | 9/2003 |
| JP | 2003 315861 | 11/2003 |
| JP | 2004 109514 | 4/2004 |
| JP | 2004 117398 | 4/2004 |
| JP | 2004 233920 | 8/2004 |
| JP | 2004 233921 | 8/2004 |
| JP | 2004 233922 | 8/2004 |
| JP | 2004 233924 | 8/2004 |
| JP | 2004 233926 | 8/2004 |
| JP | 2004 233927 | 8/2004 |
| JP | 3733032 | 1/2006 |
| JP | 3762653 | 1/2006 |
| JP | 2006 65268 | 3/2006 |
| JP | 2006 72003 | 3/2006 |
| JP | 2006 72004 | 3/2006 |
| JP | 2006 243549 | 9/2006 |
| JP | 2006 243569 | 9/2006 |
| JP | 2006 243589 | 9/2006 |
| JP | 2006 243605 | 9/2006 |
| JP | 2006 243606 | 9/2006 |
| JP | 2006 243750 | 9/2006 |
| JP | 2006 250976 | 9/2006 |
| JP | 2006 250996 | 9/2006 |
| JP | 2006 251112 | 9/2006 |
| JP | 2006 251162 | 9/2006 |
| JP | 2006 251668 | 9/2006 |
| JP | 2006 259344 | 9/2006 |
| JP | 2006 300992 | 11/2006 |
| JP | 2006 330657 | 12/2006 |
| JP | 2007 10899 | 1/2007 |
| JP | 2007 114323 | 5/2007 |
| JP | 2007 178751 | 7/2007 |
| JP | 2008 15119 | 1/2008 |
| JP | 2008 64800 | 3/2008 |
| JP | 2008 76581 | 4/2008 |
| JP | 2008 76713 | 4/2008 |
| JP | 2008 90065 | 4/2008 |
| JP | 2008 90201 | 4/2008 |

\* cited by examiner

LENS BARREL AND CAMERA

PRIORITY CLAIM

The present application is based on and claims the priority benefit of Japanese Patent Application 2006-184997 filed on Jul. 4, 2006, the contents of which are incorporated herein by reference in their entirety.

BACKGROUND OF THE INTENTION

1. Field of the Invention

The present invention relates to a lens barrel having a lens group which can be collapsed for storing and extended to a predetermined position for photographing, especially a lens barrel suitable for a zoom lens which can change a focal length by moving relatively a plurality of lens groups; and a camera equipped with the lens barrel.

2. Description of the Related Art

High performance and miniaturization are increasingly required for a photographing lens used in a photographing apparatus, such as a digital camera. In addition, a zoom lens which can change its focal length successively and has a high magnifying power is desired. These requirements are technologically challenging.

In order to cope with this technological challenge, a collapsible photographing lens, which can be collapsed to store in a main body of a photographing apparatus when not in use for photographing, is often used as an effective solution; and accordingly, a camera equipped with the collapsible photographing lens is increasing used.

Furthermore, besides miniaturization, a low-profile is also demanded. Therefore, it is required that a profile size of a lens body in a collapsed state after the lens barrel is collapsed and stored in a main body of a photographing apparatus be reduced as small as possible.

As a technological solution to cope with the low-profile demand, there has been disclosed in Japan Patent Laid-Open No. 2003-315861A (Patent document 1) and Japan Patent Laid-Open No. 2003-149723A (Patent document 2) a lens barrel which can be collapsed to be stored in a main body of a photographing apparatus and at least one of a plurality of lens groups is retracted away from an optical axis when the lens barrel is collapsed. According to the lens barrel disclosed in Patent documents 1 and 2, since the at least one of a plurality of lens groups is retracted away from the optical axis when the lens barrel is collapsed, a relatively longer retraction distance is available for the other lens groups. Therefore, it is possible to reduce the profile size in the optical axis direction of the entire lens body and accordingly the profile size of the photographing apparatus.

However, according to the configuration of the lens barrel disclosed in Patent documents 1 and 2, the lens group retracted away from the optical axis when the lens barrel is collapsed is substantially at a position located on an inner side of the maximum outer diameter of the lens barrel. Accordingly, though the profile size in the collapsed state may be reduced, the outer diameter has to be increased; that is to say, the size of the lens barrel, particularly the size of the lens barrel in a plane perpendicular to the optical axis is increased. As a result, this brings about a problem in that the size, especially the front view size, of the photographing apparatus is increased.

Furthermore, according to the configuration of the lens barrel disclosed in Patent documents 1 and 2, the lens group is retracted away from the optical axis when the lens barrel is collapsed in one moving frame or fixing member to a direction perpendicular to the optical axis. Thus there is a problem in that it is impossible for the retractable lens group to have a large moving distance along the optical axis; and there is also a limit on reduction of the profile size of the lens barrel along the optical axis when it is collapsed, and thus the profile size of the photographing apparatus.

As a technological solution to cope with the demand for a low-profile collapsible lens barrel and a camera using the collapsible lens barrel therein, Japan Patent Publication No. 3762653 (Patent document 3) discloses a guide cylinder for guiding at least one group of a plurality of lens groups to move forward or backward along the optical axis wherein the guide cylinder is made from plastic. Since the guide cylinder is made from plastic, it can be made with a complex form and this provides a possibility to increase a guiding length along the optical axis; and therefore, a moving distance along the optical axis may be increased, and as a result the lens barrel and the photographing apparatus may be made with a low-profile.

A collapsible lens barrel having a metal guide cylinder for guiding a lens-retaining frame to move forward or backward along the optical axis is also disclosed in Japan Patent Laid-Open No. 2004-233926A (Patent document 4). Although a guiding length for the lens-retaining frame is decreased since the guide cylinder is made from metal, it is possible to make a flange portion of the guide cylinder thinner; and thus it is an aim of the invention disclosed by Patent document 4 to make the lens barrel and the photographing apparatus have a low-profile when collapsed.

However, although the lens barrel disclosed in Patent document 3 may provide sufficient guiding length for the lens-retaining frame, the flange portion has to made thicker relatively since the guide cylinder is made from plastic; and this becomes a major hindrance to the low-profile of the lens barrel. Also for the lens barrel disclosed in Patent document 4, it is impossible to increase the guiding length for the lens-retaining frame since the guide cylinder is made from metal and thus there is a limit to an extending length for the lens-retaining frame when being transferred to a photographing state, in other words a movable amount from a determined extension position to the collapsed state is limited; and this eventually becomes another major hindrance to the low-profile of the lens barrel.

SUMMARY OF THE INVENTION

It is an object of the present invention to provide a lens barrel and a camera applied with the lens barrel. It is possible for the lens barrel to have a lower profile along an optical axis when a lens-retaining frame is collapsed through a configuration such that a retractable lens-retaining frame and a retractable lens-moving member are connected via a bias member and the retractable lens-retaining frame will move along the optical axis relative to the retractable lens-moving member against a bias force of the bias member in a retracting state.

It is also possible for the present invention to provide a lower profile lens barrel through a configuration such that a guide cylinder for guiding the retractable lens-retaining frame to move forward or backward is divided into a cylinder portion having a guide groove and another separate flange portion for guiding the guide cylinder itself along the optical axis, the cylinder portion being made from plastic and the flange portion being made from metal. Thus it is possible to have a sufficient guiding length for the retractable lens-retaining frame and to have a lower profile for the lens barrel when the retractable lens-retaining frame is collapsed.

Furthermore, the guide cylinder is configured to sandwich an inner surface and outer surface of the guide cylinder with the flange portion. As a result, it is possible to increase the strength of the circular guide cylinder while it is made thinner along its radius direction.

One aspect of the present invention provides a lens barrel includes a plurality of lens groups; a plurality of lens-retaining frames for retaining the plurality of lens groups, respectively; a lens-retaining frame driving device for driving the plurality of lens-retaining frames and moving at least one of the plurality of lens groups between a collapsed state and a photographing state; and a movable lens cone for retaining therein the plurality of lens-retaining frames; wherein the plurality of lens-retaining frames have a first retractable lens-retaining frame for retaining at least one of the plurality of lens groups and being retracted to a position outer than an inner radius of the movable lens cone in the collapsed state; a second retractable lens-retaining frame for retaining at least one of the plurality of lens groups and being retracted to a position outer than an inner radius of the movable lens cone in the collapsed state; a first retractable lens-moving member for retaining and moving the first retaining frame; and a second retractable lens-moving member for retaining and moving the second retractable lens-retaining frame, at least one of the first and second retractable lens-retaining frames being retained to be movable relative to the respective retractable lens-moving member along an optical axis direction in the collapsed state.

Another aspect of the present invention provides a lens barrel including a plurality of lens groups; a plurality of lens-retaining frames for retaining the plurality of lens groups, respectively; a lens-retaining frame driving device for driving the plurality of lens-retaining frames and moving at least one of the plurality of lens groups between a collapsed state and a photographing state; a movable lens cone for retaining therein the plurality of lens-retaining frames; a cam cylinder having a cam groove, which engages with a cam follower disposed in a lens-retaining frame to apply a driving force along an optical axis direction to the lens-retaining frames; a guide cylinder which engages with a rectilinear propagation key disposed in a lens-retaining frame to guide the lens-retaining frame along the optical axis direction; and a flange portion which guides the guide cylinder along the optical axis direction; wherein the guide cylinder has a cylinder portion with a guide groove, and the flange portion is a separate member from the guide cylinder.

It is preferred that the cylinder portion be made from plastic and the flange portion be made from metal.

It is further preferred that a plurality of orthogonally bent portions be disposed in the flange portion and sandwich the cylinder portion from an inner circumference side and outer circumference side.

DETAILED DESCRIPTION OF THE INVENTION

Hereinafter, embodiments of a lens barrel and a camera equipped with the lens barrel according to the present invention will be explained in detail with reference to the drawings.

Embodiment 1

Figure 1:
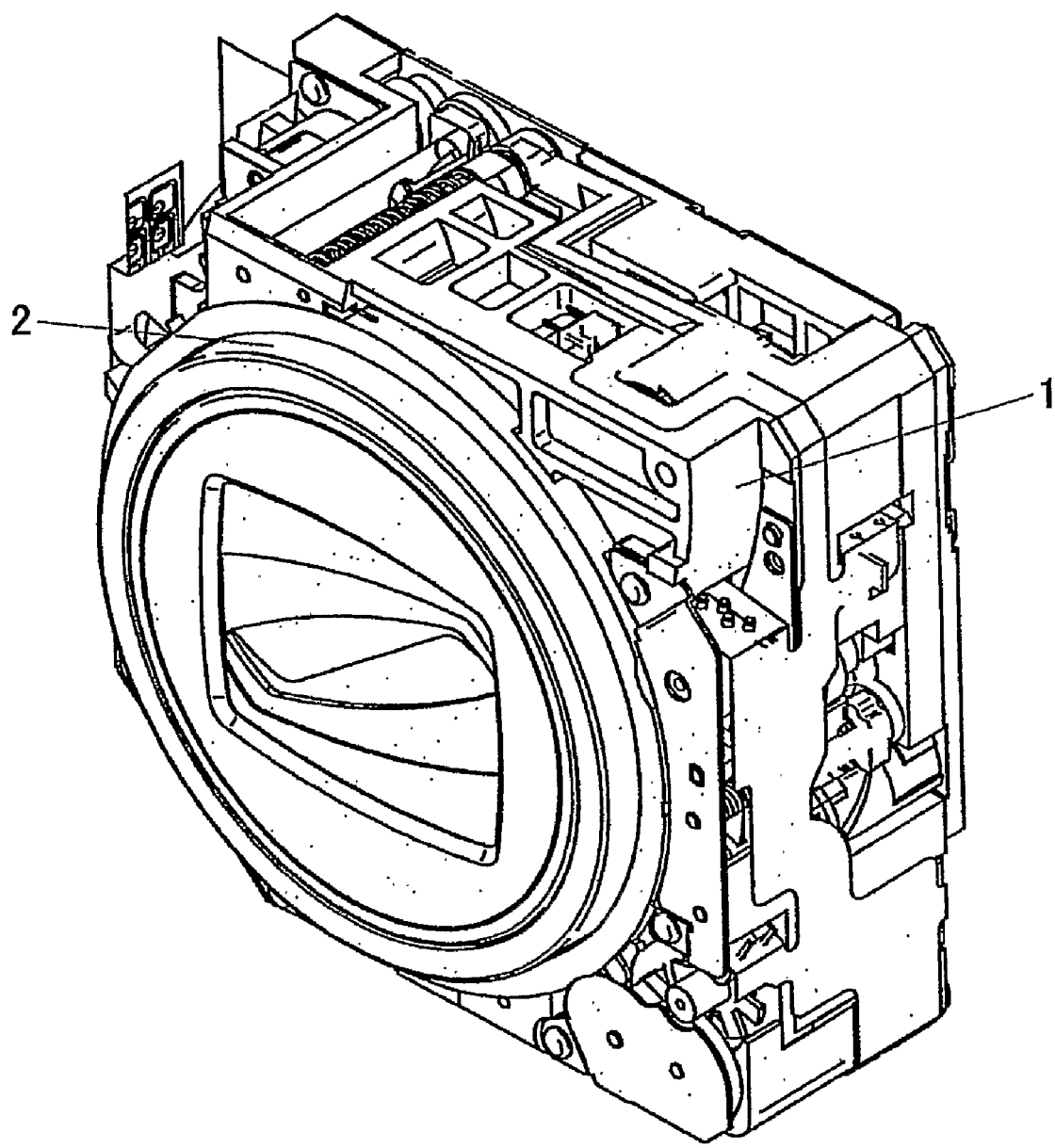
FIG. 1 is a perspective view illustrating a lens barrel according to embodiment 1 of the present invention in a collapsed state.
Figure 2:
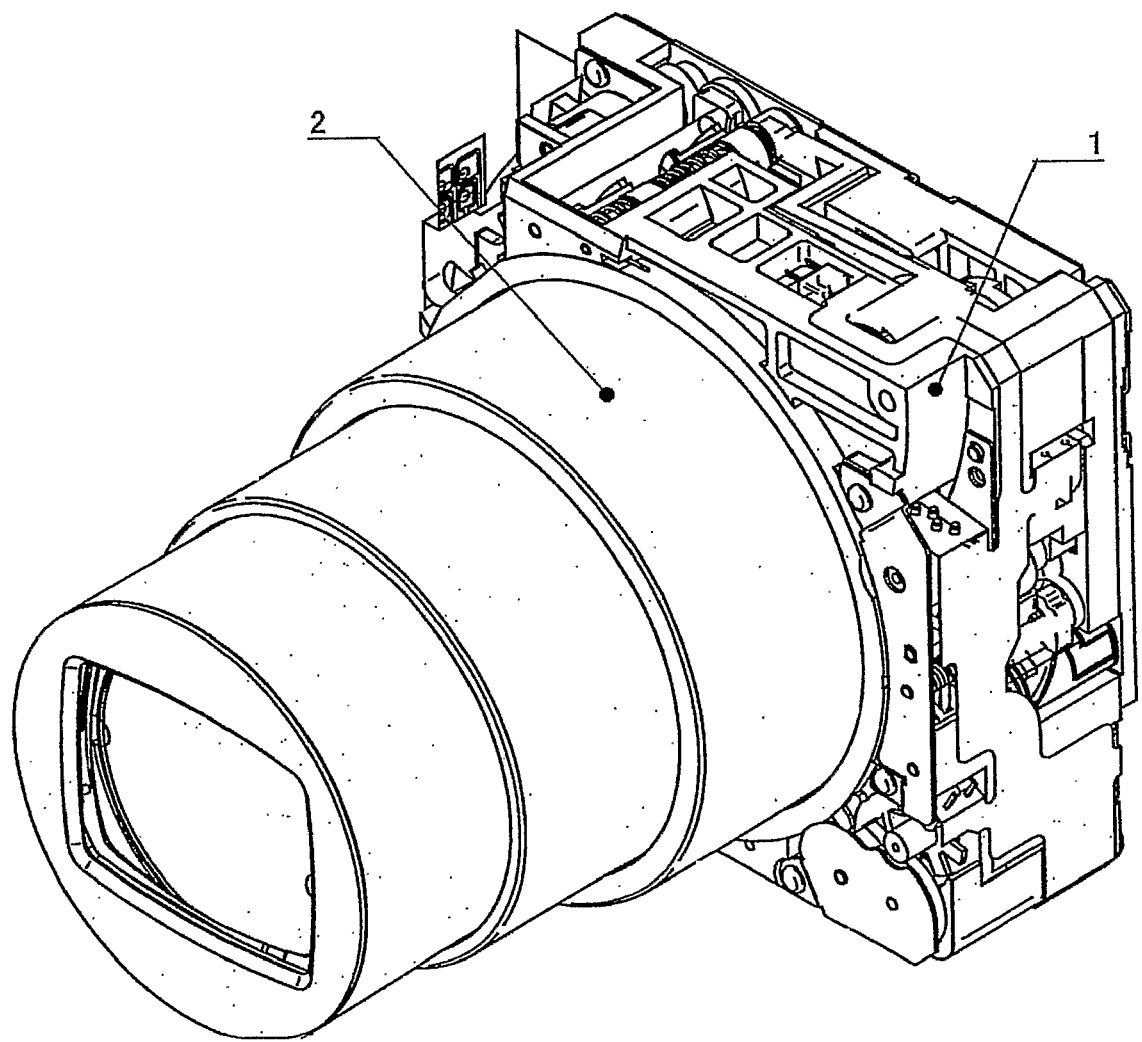
FIG. 2 is a perspective view illustrating the lens barrel according to embodiment 1 of the present invention in a photographing state.
Figure 3:
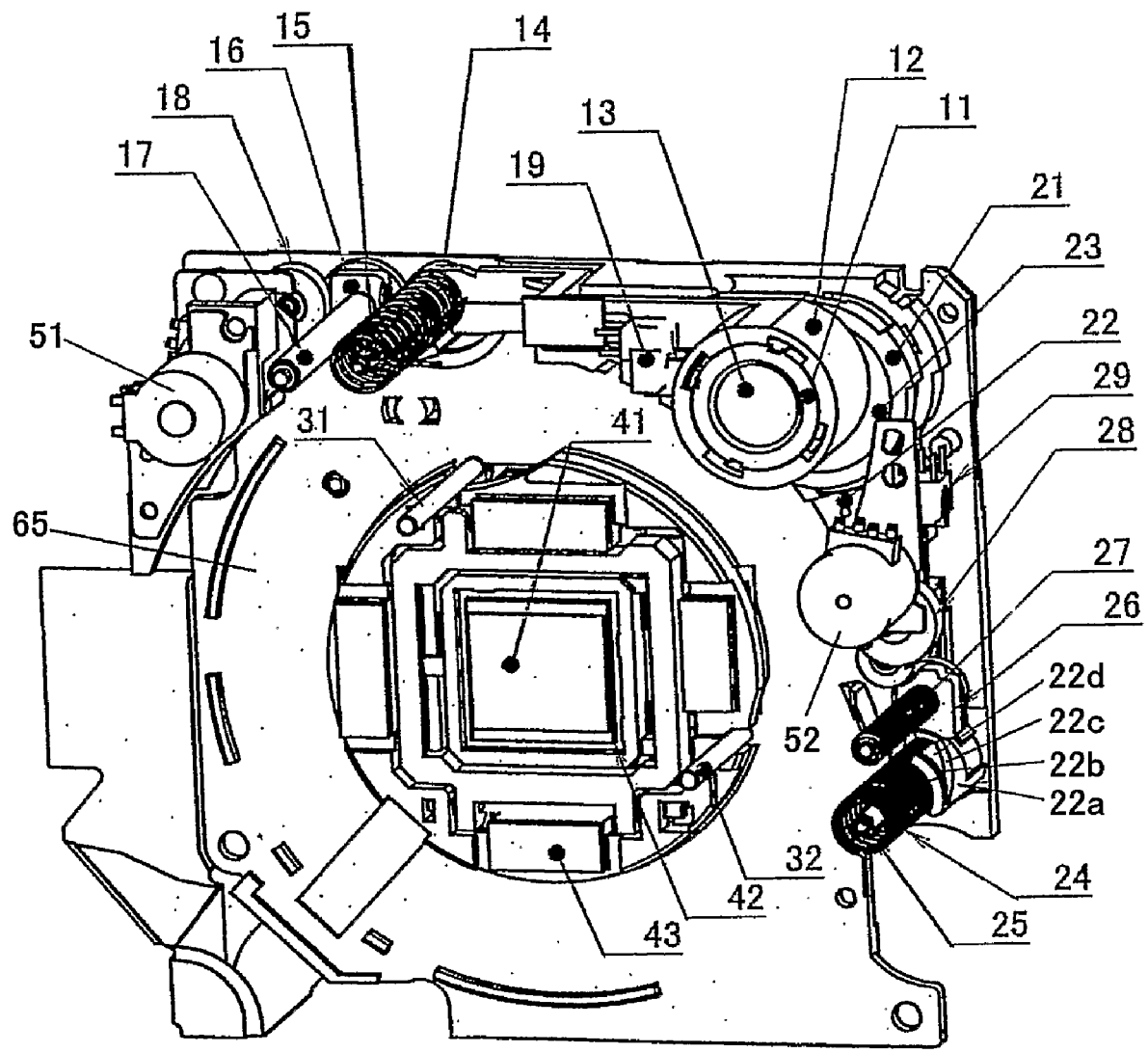
FIG. 3 is a perspective view illustrating an internal configuration of the lens barrel according to embodiment 1 of the present invention in a collapsed state.
Figure 4:
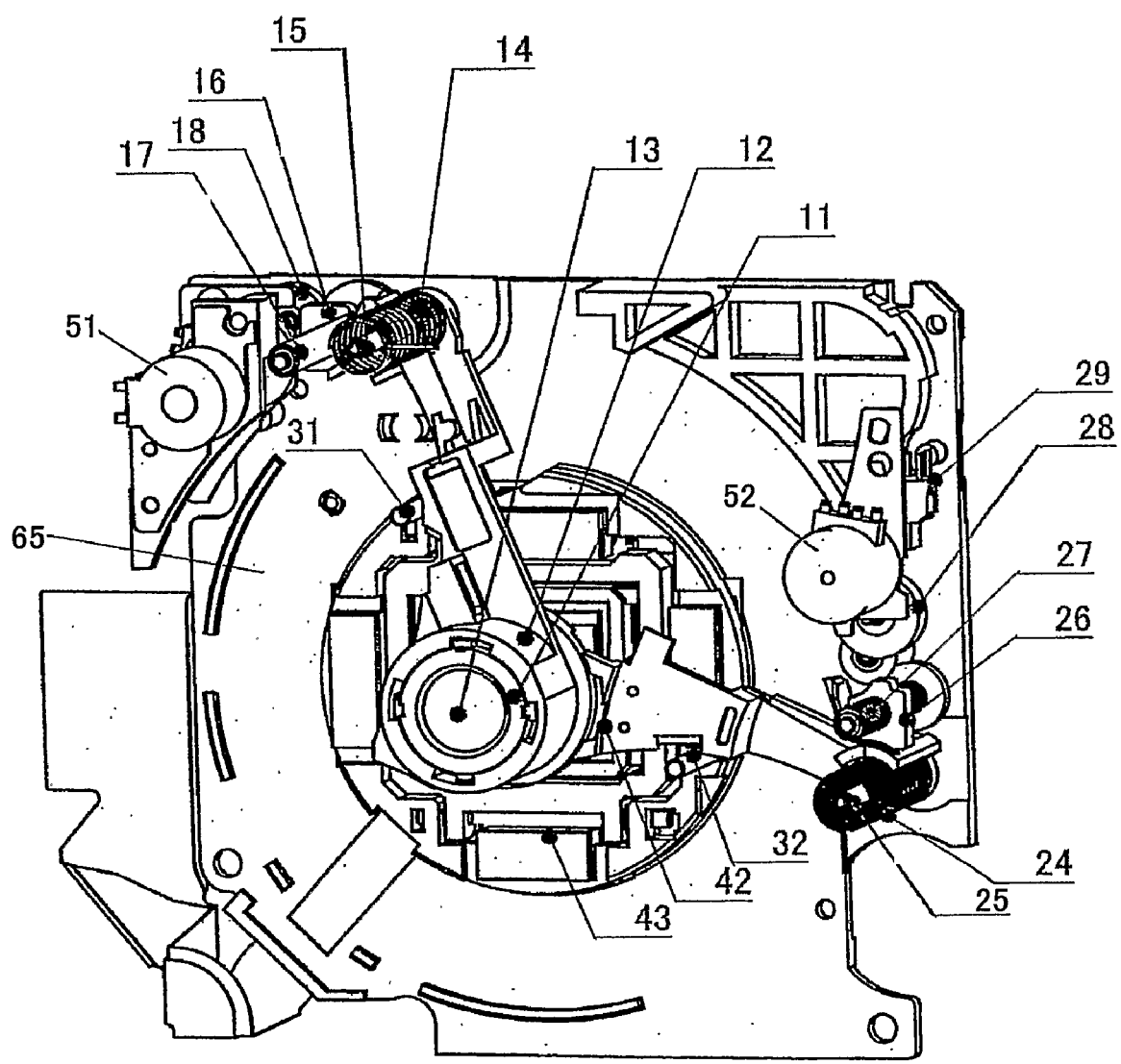
FIG. 4 is a perspective view illustrating an internal configuration of the lens barrel according to embodiment 1 of the present invention in a photographing state.
Figure 5:
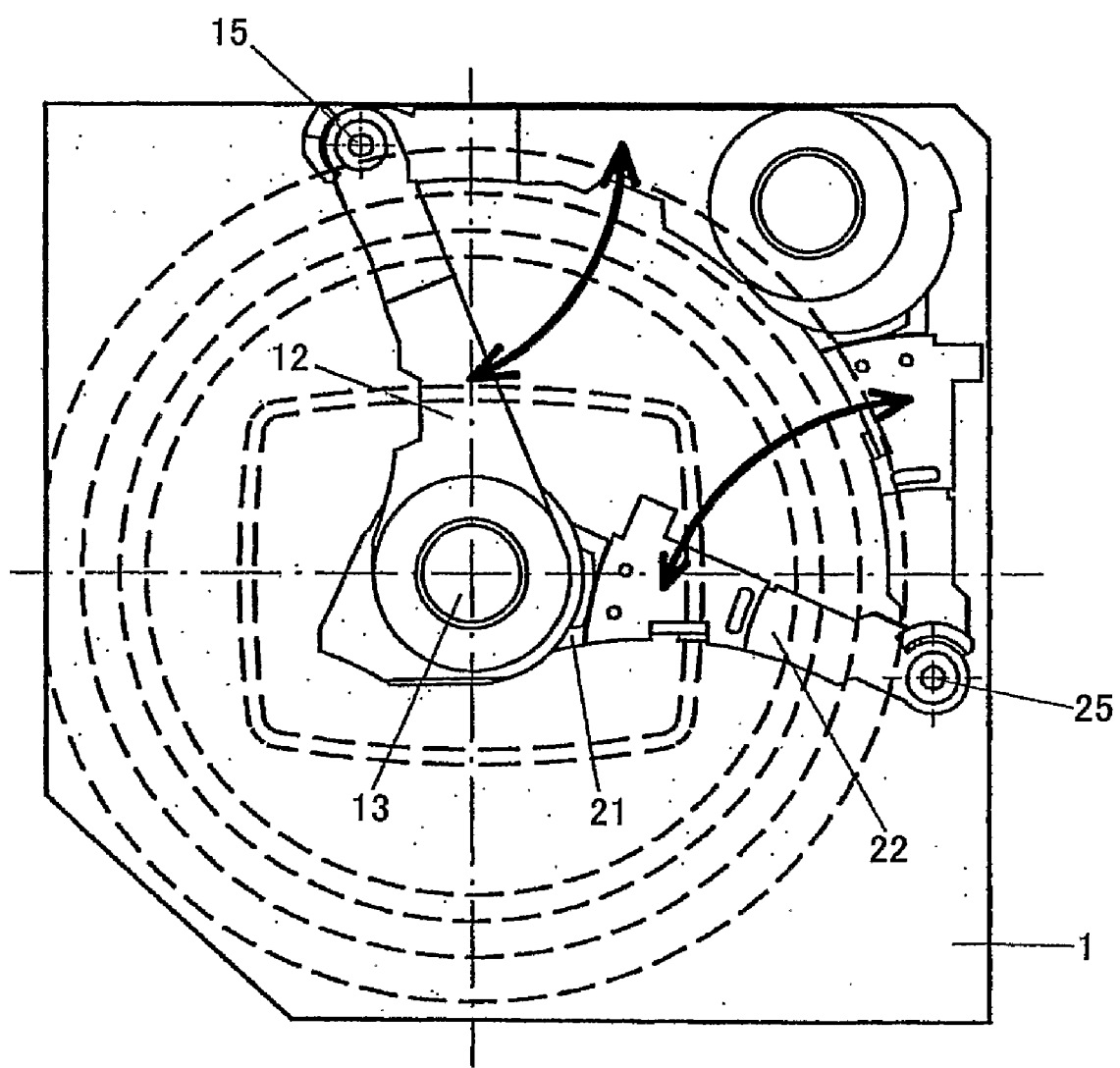
FIG. 5 is a front view illustrating movements of first and second retractable lens-moving members from a collapsed position to a photographing position according to embodiment 1.

FIGS. 1 to 5 illustrate the lens barrel according to the present invention. FIG. 1 illustrates an external view of the lens barrel with lens groups collapsed and stored in a support base 1. FIG. 2 illustrates a view of the lens barrel with lens groups extended out from the support base 1 and in a state ready for photographing. FIG. 3 illustrates a view in which a plurality of lens groups are retracted away from an optical axis and FIG. 4 shows a view in which the plural lens groups are extended to the optical axis. FIG. 5 illustrates movements of the plural lens groups extending from a collapsed position to the optical axis.

In FIGS. 1 and 2, the lens barrel has the support base 1 shaped like a square block and made from, for example, plastic. A front side of the support base 1 is opened with a circular hole 62. A rotatory cylinder 2 is embedded with the circular hole 62 through helicoids. When the rotatory cylinder 2 is rotated around its central axis, it can move with respect to the support base 1 from a retracted position as illustrated in FIG. 1 to an extended position as illustrated in FIG. 2 along the central axis. The rotatory cylinder 2 is driven by a motor not illustrated. An inner circumferential side of the rotatory cylinder 2 is embedded with a plurality of lens barrels which retain plural lens groups respectively. The plurality of lens barrels are extended out from the support base 1 like a bamboo shoot in accordance with the rotation of the rotatory cylinder 2 as illustrated in FIG. 2; or are collapsed to be stored in the support base 1 as illustrated in FIG. 1. Extending and retracting mechanism for the respective plural lens barrels has no relationship to the gist of the present invention and descriptions thereof are therefore omitted.

As illustrated in FIGS. 3 and 4, a basal plate 65 with the circular hole 62 in the center is integrally provided in the support base 1. An extending and retracting mechanism for a first retractable lens group 13 which will be explained hereinafter is disposed on the basal plate 65. A main shaft 15 is fixed at a left upper end portion of the basal plate 65. A first retractable lens-moving member 12 is disposed in a configuration such that it can rotate around the main shaft 15 in a plane parallel to the plane containing the basal plate 65. A tip end portion of the first retractable lens-moving member 12 has a cylindrical shape and is embedded with a first retractable lens-retaining frame 11 for retaining the first retractable lens group 13.

The lens barrel according to embodiment 1 includes 4 lens groups. The first retractable lens group 13 constitutes a third lens group and a second retractable lens group 23 which will be explained hereinafter makes up a fourth lens group. A first lens group and a second lens group are not illustrated in figures.

The first retractable lens-moving member 12 not only can rotate around the main shaft 15 to a retracted state in which the first retractable lens-moving member 12 is collapsed to the upper end portion of the basal plate 65 as illustrated in FIG. 3, or to an extended state in which the first retractable lens-moving member 12 and the circular hole 62 have substantially a common central axis, but also can slide along the main shaft 15.

Figure 6:
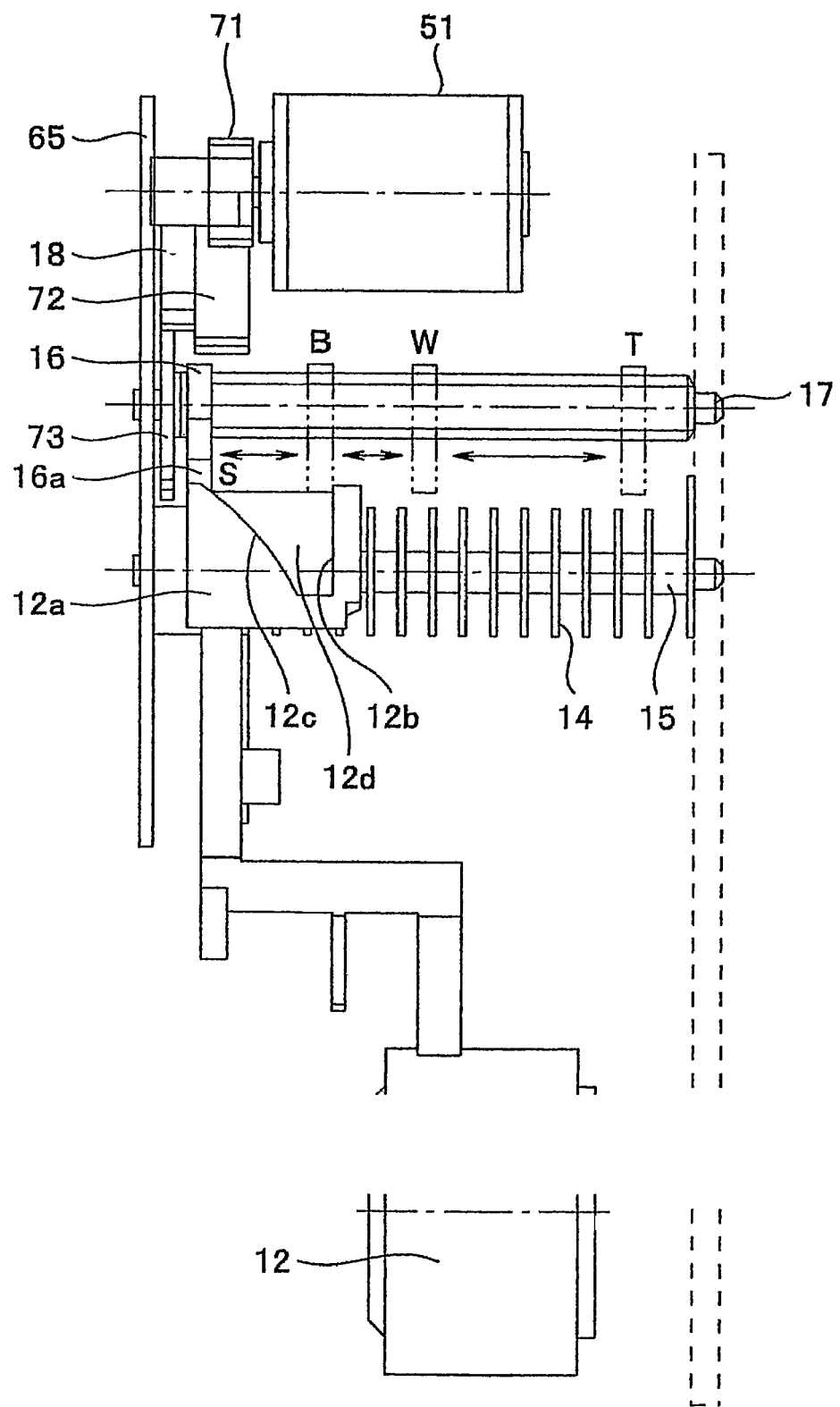
FIG. 6 is a side view illustrating the first retractable lens-moving member and a lens-retaining frame driving device according to embodiment 1.

As also illustrated in FIG. 6, a basal end portion of the first retractable lens-moving member 12 is formed integrally with a partial cylindrical portion 12a along a circular arc centered with the main shaft 15. An outer circumference of the partial cylindrical portion 12a is formed with a concave portion 12d. One end (right side in FIG. 6) of the concave portion 12d is defined with a jaw-shaped engaging portion 12b formed orthogonally to the main shaft 15 and the other end thereof is defined with a cam surface 12c inclined with respect to the main shaft 15.

A compression coil spring 14 is embedded at the outer circumference of the main shaft 15 as a bias element. The compression coil spring 14 exerts a bias force toward the basal plate 65 along the main shaft 15 to the basal end portion of the first retractable lens-moving member 12. Furthermore, one end of the compression coil spring 14 is fixed to the first retractable lens-moving member 12 and the other end thereof is fixed to an appropriate fixing object. Therefore, the first retractable lens-moving member 12 is rotatably biased so as to extend the first retractable lens group 13 from a retracted position as illustrated in FIG. 3 to a photographing position as illustrated in FIG. 4.

As illustrated in FIGS. 3, 4 and 6, the basal plate 65 is disposed with a lead screw 17 lateral to the main shaft 15 and a female screw 16 embedded at an outer circumference of the lead screw 17. External threads formed at the outer circumference of the lead screw 17 match internal threads formed in the inner circumference of the female screw 16. The female screw 16 is disposed in such a way that it can not rotate around the lead screw 17. Therefore when the lead screw 17 rotates, the female screw 16 is moved along the lead screw 17 as a result of the matched external threads of the lead screw 17 and internal threads of the female screw 16.

A third lens group driving motor 51 is disposed at a lateral side to the female screw 16. A small gearwheel 71 is disposed integrally to an output axis of the third lens group driving motor 51. A big gearwheel 72 is matched with the small gearwheel 71. Therefore, a rotation driving force from the third lens group driving motor 51 is transferred from the small gearwheel 71 to the big gearwheel 72, and then to a gearwheel 73 disposed integrally to the lead screw 17 via a small gearwheel 18 integral to the big wheel 72. When the gearwheel 73 is rotated by the rotation driving force, the lead screw 17 rotates; and as a result the female screw 16 is moved linearly along the lead screw 17, as mentioned above.

The female screw 16 is provided with a protruding portion 16a protruding outward along a radial direction at its basal portion. The protruding portion 16a can enter into the concave portion 12d in the linear travel range of the female screw 16 and therefore the engaging portion 12b and cam surface 12c are accordingly positioned in the linear travel range of the female screw 16.

FIG. 6 illustrates the retracted state same as that illustrated in FIG. 3 in which the first retractable lens-moving member 12 is rotated against the bias force from the compression coil spring 14. In other words, the female screw 16 is moved to the basal portion of the lead screw 17, the protruding portion 16a of the female screw 16 pushes against the cam surface 12c to make the first retractable lens-moving member 12 rotate to the retracted position against the bias force from the compression coil spring 14. At the retracted position, the bias force from the compression coil spring 14 functions as a driving force to move the first retractable lens-moving member 12 backward in the optical axis direction. In detail, when the female screw 16 is moved to the basal portion of the lead screw 17, the protruding portion 16a leaves the engaging portion 12b; as a result, the first retractable lens-moving member 12 is moved backward in the optical axis direction along the main shaft 15 by the bias force from the compression coil spring 14.

As illustrated in FIG. 3, a position detecting device 19 for detecting whether or not the first retractable lens-moving member 12 is at the retracted position is disposed near the upper end portion of the basal plate 65. When the position detecting device 19 detects that the first retractable lens-moving member 12 is at the retracted position, it outputs a detection signal. According to the detection signal from the position detecting device 19, the driving motor 51 is stopped and so is the retracting operation of the first retractable lens-moving member 12.

As illustrated in FIG. 6, when the first retractable lens-moving member 12 is at the retracted position, the position of the female screw 16 is represented with a numeral S; when the female screw 16 is moved along the lead screw 17 and the protruding portion 16a contacts the engaging portion 12b of the first retractable lens-moving member 12, the position of the female screw 16 is represented with a numeral B. The position of the female screw 16 is represented with a numeral W when lens groups are at a wide-angle photographing position; and a numeral T represents the position of the female screw 16 when lens groups are at a telephotographing position.

When the female screw 16 is driven by the motor 51 to move along the lead screw 17 from the position S toward a tip end side of the lead screw 17, the protruding portion 16a moves away from the cam surface 12c and the first retractable lens-moving member 12 is rotated by the bias force from the compression coil spring 14 to the photographing state as illustrated in FIG. 4.

When the female screw 16 is driven to move to the position B in FIG. 6, the first retractable lens-moving member 12 contacts to a position determination pin 31 disposed erecting on the basal plate 65 and the rotation of the first retractable lens-moving member 12 is limited by the position determination pin 31, therefore the optical axis of the first retractable lens group 13 matches the optical axis of the other lens groups. In the mean time the protruding portion 16a contacts to the engaging portion 12b.

When the female screw 16 is further driven to move continuously, the protruding portion 16a pushes the engaging 12b and moves the first retractable lens-moving member 12 along the optical axis direction to the wide-angle photographing position W, in the mean time, other lens groups are also moved to the corresponding position respectively. This is a position possible for a photographing.

After that, when first retractable lens-moving member 12 is continuously moved along the optical axis direction according to the movement of the female screw 16, coupling with the movements of the other lens groups, a focal length of the lens groups varies continuously and finally reaches the telephotographing position T as illustrated in FIG. 6. At this position, the first retractable lens-moving member 12, together with the other lens groups, reaches a moving limit along the optical axis direction.

The position determination pin 31 also functions as a guide axis for guiding the first retractable lens-moving member 12 when the first retractable lens-moving member 12 is moved along the optical axis direction so that the optical axis of the first retractable lens group 13 will not deviate.

As illustrated in FIGS. 3 and 4, an extending and retracting mechanism for the second retractable lens group 23 is disposed at a right edge portion of the basal plate 65. This is a mechanism for moving the second retractable lens group 23 constituting the fourth lens group from a retracted position as illustrated in FIG. 3 to a photographing position as illustrated in FIG. 4. The mechanism is substantially the same as the extending and retracting mechanism for the first retractable lens group 13 in principle.

A main shaft 25 is fixed at a right lower end portion of the basal plate 65. The second retractable lens-moving member 22 is disposed to be able to rotate around the main shaft 25 in a plane parallel to the plane containing the basal plate 65. A tip end of the second retractable lens-moving member 22 is connected with a second retractable lens-retaining frame 21 for retaining the second retractable lens group 23.

The second retractable lens-moving member 22 not only can rotate around the main shaft 25 to a retracted state in which the second retractable lens-moving member 22 is collapsed to the right end portion of the basal plate 65 as illustrated in FIG. 3, or to an extended state in which the second retractable lens-moving member 22 and the circular hole 62 have substantially a common central axis, but also can slide along the main shaft 25.

As illustrated in FIG. 3, a basal end portion of the second retractable lens-moving member 22 is formed integrally with a partial cylindrical portion 22a along a circular arc centered with the main shaft 25. Similar to the configuration of the partial cylindrical portion 12a, an outer circumference of the partial cylindrical portion 22a is formed with a concave portion 22d. One end of the concave portion 22d is defined with a jaw-shaped engaging portion 22b formed orthogonally to the main shaft 25 and the other end thereof is defined with a cam surface 22c inclined with respect to the main shaft 25.

A compression coil spring 24 is embedded at the outer circumference of the main shaft 25 as a bias element. The compression coil spring 24 exerts a bias force toward the basal plate 65 along the main shaft 25 to the basal end portion of the second retractable lens-moving member 22. Furthermore, one end of the compression coil spring 24 is fixed to the second retractable lens-moving member 22 and the other end thereof is fixed to an appropriate fixing object. Therefore, the second retractable lens-moving member 22 is rotatably biased so as to extend the second retractable lens group 23 from a retracted position as illustrated in FIG. 3 to a photographing position as illustrated in FIG. 4.

As illustrated in FIGS. 3 and 4, the basal plate 65 is disposed with a lead screw 27 lateral to the main shaft 25 and a female screw 26 embedded at an outer circumference of the lead screw 27. External threads formed at the outer circumference of the lead screw 27 match internal threads formed in the inner circumference of the female screw 26. The female screw 26 is disposed in such a way that it can not rotate around the lead screw 27. Therefore when the lead screw 27 rotates, the female screw 26 is moved along the lead screw 27 as a result of the matched external threads of the lead screw 27 and internal threads of the female screw 26.

A fourth lens group driving motor 52 is disposed at a lateral side to the female screw 26. A small gearwheel is disposed integrally to an output axis of the fourth lens group driving motor 52. A rotation driving force from the fourth lens group driving motor 52 is transferred from the small gearwheel to a gearwheel disposed integrally with the lead screw 27 through a train of gearwheels disposed therebetween, and thus to the lead screw 27. A numeral 28 in FIGS. 3 and 4 represents one example of the train of gearwheels. When the lead screw 27 is rotated by the rotation driving force, the female screw 26 is moved linearly along the lead screw 27, as mentioned above.

The female screw 26 is also provided with a protruding portion which is similar to the protruding portion 16a of the female screw 16. The protruding portion of the female screw 26 is configured to contact the cam surface 22c and the engaging portion 22b of the second retractable lens-moving member 22 when the female screw 26 is moved to make a linear movement along the lead screw 27.

When the protruding portion of the female screw 26 escapes away from the cam surface 22c, the second retractable lens-moving member 22 is rotated toward the photographing position as illustrated in FIG. 4 by the bias force from the compression coil spring 24; when the protruding portion of the female screw 26 moves by pushing the cam surface 22c, the second retractable lens-moving member 22 is rotated against the bias force from the compression coil spring 24 to move to the retracted position as illustrated in FIG. 3.

The movement of the second retractable lens-moving member 22 in accordance with the linear movement of the female screw 26 is substantially similar to that of the first retractable lens-moving member 12, as illustrated in FIG. 6. When the female screw 26 is moved to linearly travel from the basal end toward the tip end of the lead screw 27, the second retractable lens-moving member 22 is firstly extended from the retracted position to the photographing position. When the female screw 26 is further driven to linearly travel, the protruding portion contacts the engaging portion 22b and thus the second retractable lens-moving member 22 is extended toward the optical axis against the bias force. The second retractable lens-moving member 22 is finally moved to the telephotographing position.

When the second retractable lens-moving member 22 is extended to the photographing position as illustrated in FIG. 4, the second retractable lens-moving member 22 contacts a position determination pin 32 disposed erecting on the basal plate 65 and the rotation of the second retractable lens-moving member 22 is limited by the position determination pin 32; therefore the optical axis of the second retractable lens group 23 matches the optical axis of the photographing lens groups. The position determination pin 32 also functions as a guide axis for guiding the second retractable lens-moving member 22 when the second retractable lens-moving member 22 is moved along the optical axis direction so that the optical axis of the second retractable lens group 23 will not deviate.

As illustrated in FIGS. 3 and 4, a position detecting device 29 for detecting whether or not the second retractable lens-moving member 22 is at the retracted position is disposed near the right end portion of the basal plate 65. When the position detecting device 29 detects that the second retractable lens-moving member 22 is at the retracted position, it outputs a detection signal. According to the detection signal from the position detecting device 29, the driving motor 52 is stopped and so is the retracting operation of the second retractable lens-moving member 22.

As illustrated in FIG. 5, when the first retractable lens-moving member 12 rotates clockwise using the main shaft 15 as a center and the second retractable lens-moving member 22 rotates anticlockwise using the main shaft 25 as a center respectively, the third lens group 13 and the fourth lens group 23 are extended respectively to the photographing position and their optical axis match the optical axis of the other lens groups. Rotation control is performed respectively on the driving motors 51 and 52 to maintain a predetermined interval along the optical axis between the third lens group 13 and the fourth lens group 23 at the photographing position, and the predetermined interval is maintained when the photographing lens groups are zoomed.

To collapse the lens barrel, the first retractable lens-moving member 12 is rotated anticlockwise by the driving motor 51 and the second retractable lens-moving member 22 is rotated clockwise by the driving motor 52.

When the first retractable lens-moving member 12 and the second retractable lens-moving member 22 are at the respective retracted position, the first lens group and the second lens group are configured to be collapsed by moving back away from the a photographing subject together with a movable lens cone for retaining the first lens group and the second lens group. The mechanism for collapsing the respective first and second lens groups is irrelevant to the gist of the present invention and thus is not illustrated in figures. When the first retractable lens-moving member 12 and the second retractable lens-moving member 22 are at the respective retracted position, the first retractable lens-moving member 12 and the second retractable lens-moving member 22 and their respective driving devices are configured to guarantee the first retractable lens-moving member 12 and the second retractable lens-moving member 22 are retracted respectively to a position outer than an inner radius of the movable lens cone. As a result, it is possible to obtain a longer retractable distance along the optical axis when the lens groups are collapsed and a lower profile for the lens barrel in the collapsed state.

The driving device for the first retractable lens-moving member 12 includes the partial cylindrical portion 12a, the lead screw 17, the female screw 16, a train of gearwheels and the driving motor 51. The driving device for the second retractable lens-moving member 22 includes the partial cylindrical portion 22a, the lead screw 27, the female screw 26, a train of gearwheels and the driving motor 52.

In order to obtain a lens barrel with a low-profile in the collapsed state as low as possible, it is preferred that a relative interval between the first retractable lens-moving member 12 and the second retractable lens-moving member 22 be as small as possible and it is thought that the relative interval reaches a limit when the two contact with each other along the optical axis direction. However according to the present invention, the two moving members not only contact but also actively interfere with each other; therefore the profile for the lens barrel is further decreased. Explanations will be carried out with reference to FIGS. 11 and 12.

Figure 11:
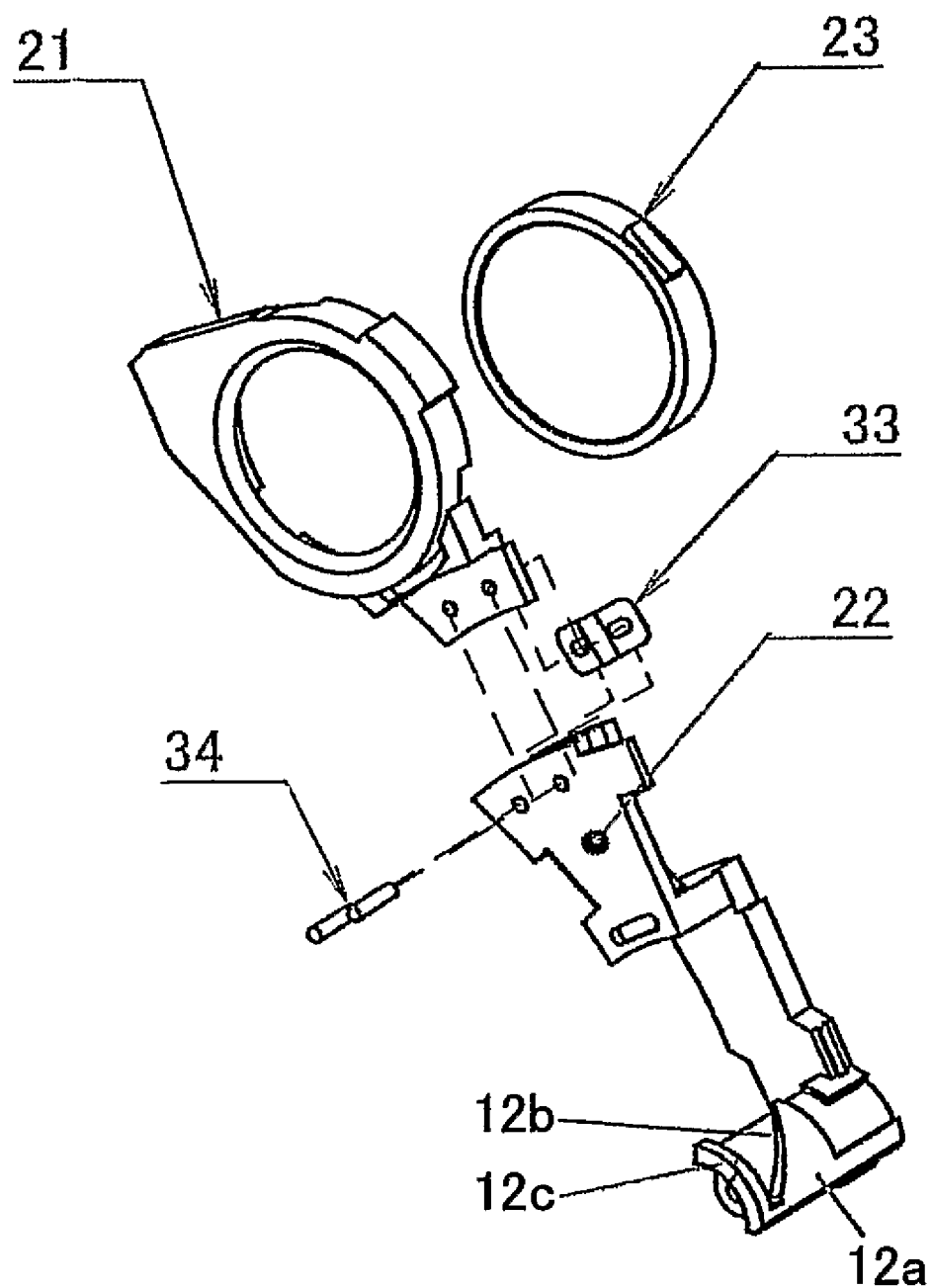
FIG. 11 is an exploded perspective view illustrating the second retractable lens-moving member according to embodiment 1.

As illustrated in FIGS. 11 and 12, the second retractable lens-retaining frame 21 is a separate member with respect to the second retractable lens-moving member 22 and it is retained movable along the optical axis direction relative to the second retractable lens-moving member 22. The configuration thereof will be described hereinafter.

A tip end of the second retractable lens-moving member 22 is formed with a fan shape and is connected with a connection portion of the second retractable lens-retaining 21 through two guide pins 34. Each guide pin 34 is punched into a hole formed in the tip end of the second retractable lens-moving member 22, the protruded portion of the guide pin 34 from the back surface of the tip end penetrates a guide hole formed in the connection portion of the second retractable lens-retaining 21. In such a way, the second retractable lens-retaining 21 is connected to the second retractable lens-moving member 22 and is movable with respect to the second retractable lens-moving member 22 in the optical axis direction along the guide pin 34.

A plate spring 33 is provided between the second retractable lens-moving member 22 and the second retractable lens-retaining 21 as a bias member for preventing the two guide pins 34 from falling off. The plate spring 33 biases the second retractable lens-retaining 21 so that the second retractable lens-retaining 21 will have a tendency to move with relation to the second retractable lens-moving member 22 toward an imaging surface side. An appropriate disengagement-preventing measure is performed to the second retractable lens-retaining 21 so that the second retractable lens-retaining 21 will not disengage from the guide pin 34 by the bias force from the plate spring 33. Inside the second retractable lens-retaining 21, there is embedded the fourth lens group 23.

When the second retractable lens-moving member 22 is extended to the photographing position as illustrated in FIG. 4, it will not interfere with the first retractable lens-moving member 12. However, when the first retractable lens-moving member 12 and the second retractable lens-moving member 22 are collapsed to the retracted position as illustrated in FIG. 3, they interfere with each other and the first retractable lens-moving member 12 presses the second retractable lens-moving member 22 along the optical axis direction. The details thereof will be explained hereinafter with reference to FIG. 12.

As seen from figures in the order of 12A, 12C, 12B and 12D, when being collapsed from the photographing position to the retracted position, the second retractable lens-moving member 22 is retracted firstly, followed by the first retractable lens-moving member 12. As seen from FIG. 12A, the first retractable lens-moving member 12 and the second retractable lens-moving member 22 are not overlapped along the optical axis direction, thus there is no interference between the two moving members; and there is a clearance in the connecting portion of the two moving members. The clearance is caused by the bias force from the plate spring 33.

Figure 12A:
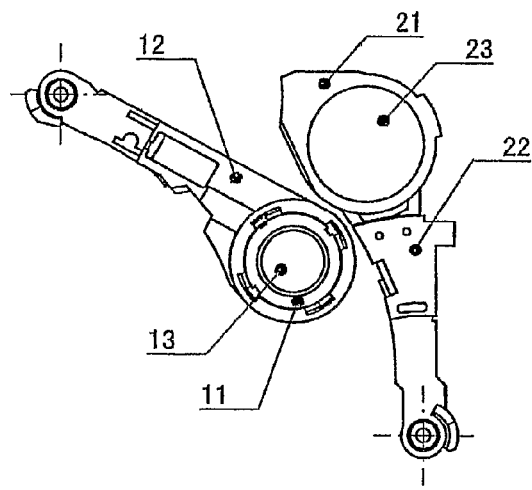
FIG. 12A is a front view illustrating an intermediate state between the retracted position and the photographing position of the first and second retractable lens-moving members according to embodiment 1.
Figure 12B:
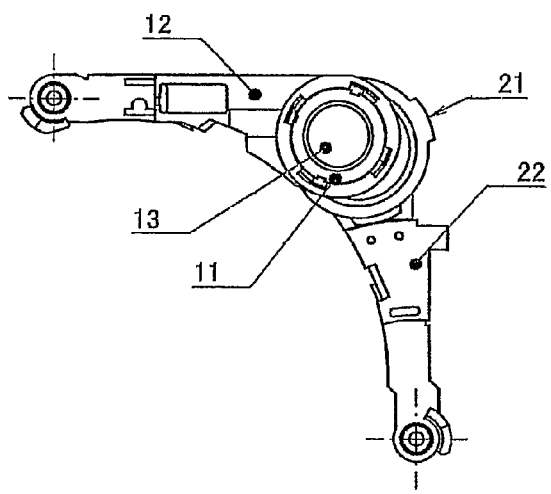
FIG. 12B is a front view illustrating the first and second retractable lens-moving members in the retracted position according to embodiment 1.
Figure 12C:
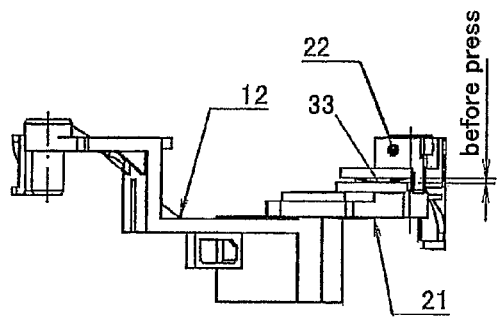
FIG. 12C is a top view illustrating the intermediate state between the retracted position and the photographing position of the first and second retractable lens-moving members according to embodiment 1.
Figure 12D:
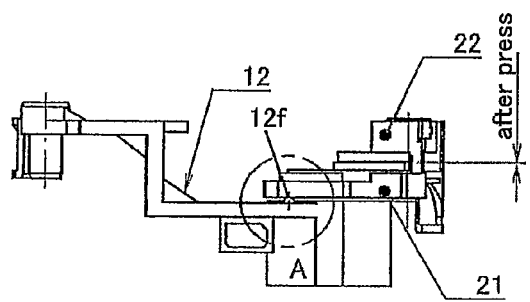
FIG. 12D is a top view illustrating the first and second retractable lens-moving members in the retracted position according to embodiment 1.
Figure 12E:
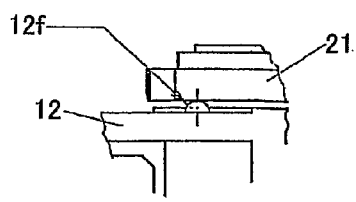
FIG. 12E an enlarged top view illustrating a portion including a protruding element as illustrated in FIG. 12D.

When the first retractable lens-moving member 12 is further retracted, the first retractable lens-moving member 12 and the second retractable lens-moving member 22 are overlapped along the optical axis direction. In the retracted position illustrated in FIG. 12D, a protrusion 12f disposed in the first retractable lens-moving member 12 as a contacting portion comes into contact with the second retractable lens-retaining frame 21 connected to the second retractable lens-moving member 22 and presses the second retractable lens-retaining frame 21 to move relatively along the optical axis direction. FIG. 12E is an enlarged view illustrating an area A including the protrusion 12f as illustrated in FIG. 12D. As a result, the second retractable lens-retaining frame 21 is pushed by the protrusion 12f to move backward from the photographing subject side along the optical axis direction against the bias force from the plate spring 33. As seen from FIG. 12E, the clearance in the connecting portion of the second retractable lens-moving member 22 and the second retractable lens-retaining frame 21 in FIG. 12C no longer exists.

When the first and second retractable lens-moving members 12 and 22 are moved respectively from the retracted position to the photographing position, a reverse operation to the above-mentioned operation is performed.

Preceding the second retractable lens-moving member 22, the first retractable lens-moving member 12 is firstly rotated. As a result of the rotation, the protrusion 12f leaves the second retractable lens-retaining frame 21 and the second retractable lens-retaining frame 21 is moved forward along the optical axis direction by the bias force. Thereafter, the second retractable lens-moving member 22 is also rotated to follow the first retractable lens-moving member 12. Both of them reach the photographing position finally. In order to provide a time lapse between the rotations of the two moving members, separate driving motors 51 and 52 are disposed respectively as a driving device and the two driving motors are separately controlled by a controlling portion such as a microprocessor unit (MPU).

The driving devices for driving the first and second retractable lens-moving members 12 and 22 include position detecting devices 19 and 29, respectively. The above-mentioned MPU is programmed to collapse the first and second lens groups when the first and second retractable lens-moving members 12 and 22 are detected by the respective position detecting devices 19 and 29 to be at the respective retracted position. According to such a configuration, it is possible to prevent the retractable lens groups 13 and 23 which are retracted outside the optical axis from intervening with the first and second lens groups while performing the collapsing operation.

According the above-mentioned embodiment, the first and second retractable lens-retaining frames 11 and 21 are retained by the first and second retractable lens-moving members 12 and 22, respectively. The first and second retractable lens-retaining frames 11 and 21 for retaining the third and fourth lens groups 13 and 23 respectively are retracted outer than the inner radius of the movable lens cone when they are collapsed, therefore the retractable distance for the movable lens cone retaining the other lens groups is increased.

In addition, the second retractable lens-retaining frame 21 is not only retained to be movable along the optical axis direction with relation to the second retractable lens-moving member 22 but also biased toward a front side of the optical axis by the plate spring 33; thus when the first and second retractable lens-moving members 12 and 22 are collapsed to the retracted position respectively, the second retractable lens-retaining frame 21 is moved backward along the optical axis direction against the bias force; as a result it is possible to further increase the retractable distance for the movable lens cone and obtain a further low-profile lens barrel. This effect will be explained in detail by comparing with a conventional lens barrel in which lens-retaining frames are simply retracted outer an inner radius of a movable lens cone, with reference to FIGS. 7 to 10.

Figure 7:
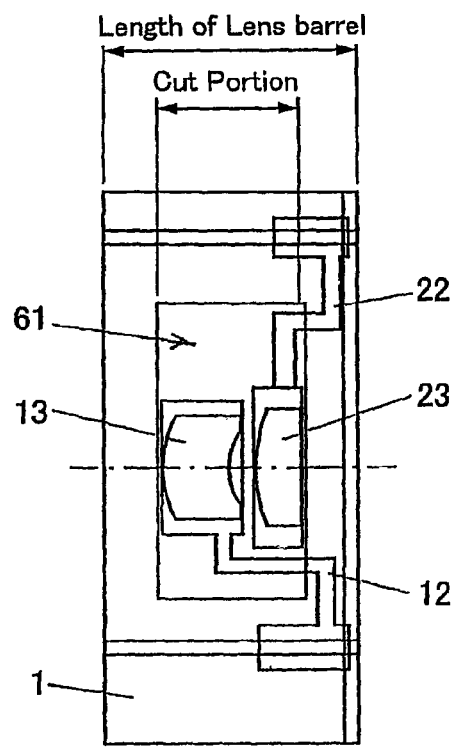
FIG. 7 is a side view illustrating two retractable lens-moving members and a fixing frame of a conventional lens barrel.
Figure 9:
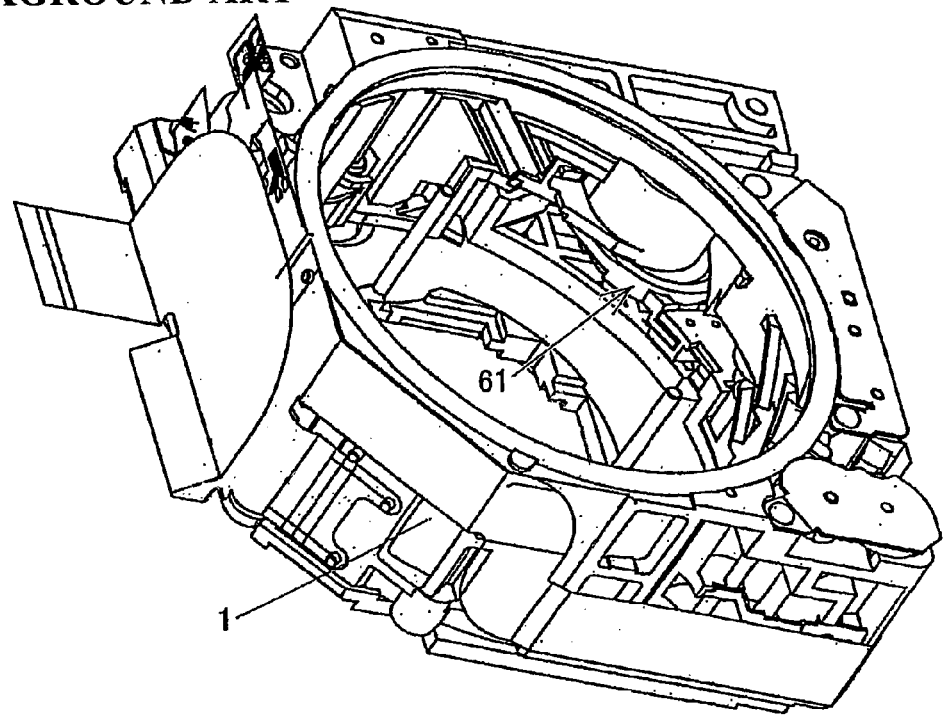
FIG. 9 is a perspective view illustrating internal mechanisms and a fixing frame of a conventional lens barrel.
Figure 10:
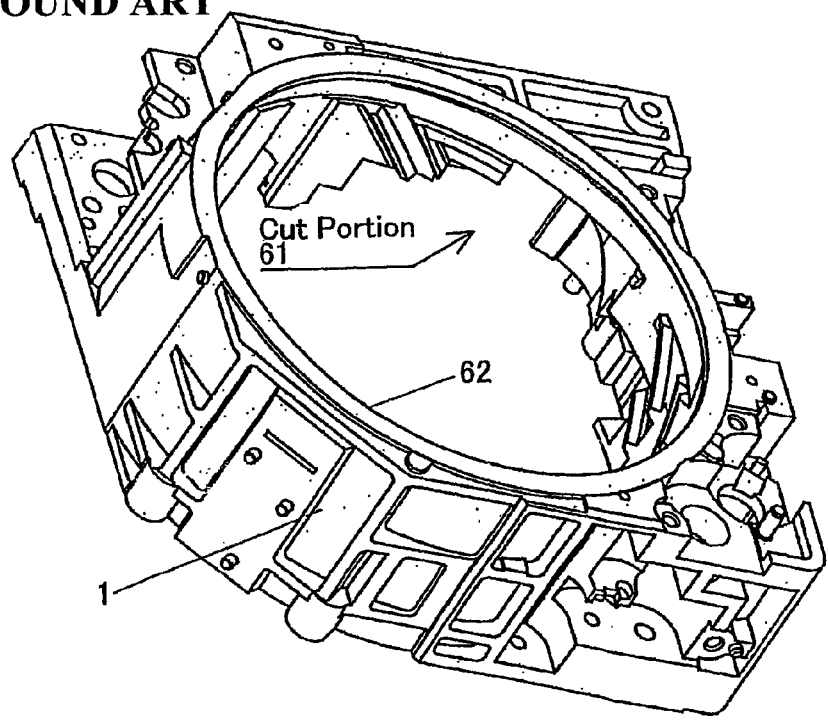
FIG. 10 is a perspective view illustrating a fixing frame only with internal mechanisms omitted and a clearly displayed opening portion as a moving passage for retractable lens groups of a conventional lens barrel.

Similar to the lens barrel of the present invention, the conventional lens barrel as illustrated in FIGS. 7, 9 and 10 includes the first retractable lens-moving member 12 for the third lens group 13 and the second retractable lens-moving member 22 for the third lens group 23. When these moving members 12 and 22 are rotated, the lens groups 13 and 23 are only retracted outer than the inner radius of the movable lens cone. An opening portion 61 is disposed at a support base 1. A dimension along optical axis direction of the opening portion 61 should include a sum of dimensions along the optical axis direction of lens-retaining frames retained by the members 12 and 22 respectively and a clearance between the lens-retaining frames so that they do not interfere with each other. As a result, the dimension along the optical axis direction of the opening portion 61 becomes large and accordingly the size of the support base 1 and the lens barrel along the optical axis direction.

Figure 8:
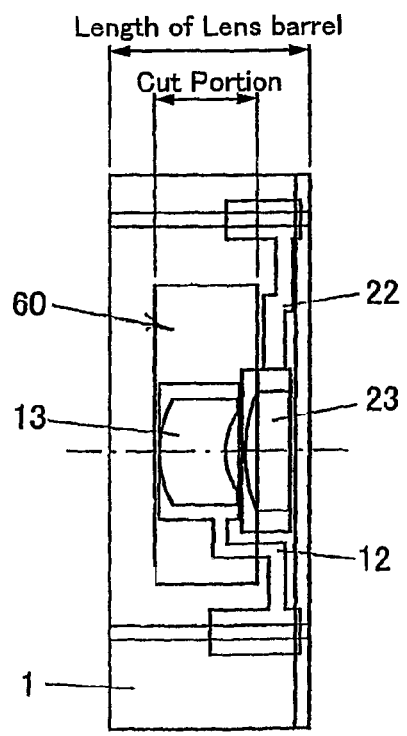
FIG. 8 is a side view illustrating a relationship between two retractable lens-moving members in a retracted position and a fixing frame according to embodiment 1.

However, according to the present invention, when being collapsed from the photographing position to the retracted position, the second retractable lens-moving member 22 is retracted firstly, followed by the first retractable lens-moving member 12 while pressing the second retractable lens-moving member 22 backward along the optical axis direction. Thus as illustrated in FIG. 8, the cut portion 61 for the first and second retractable lens-retaining frames 11 and 21 to be retracted to the retracted position can be designed smaller than the sum size of dimensions along the optical axis direction of the first and second retractable lens-retaining frames 11 and 21. Furthermore, there is no clearance between the first and second retractable lens-retaining frames 11 and 21 when they are retracted; therefore the dimension of the cut portion 61 can be designed even smaller. Accordingly it is possible to decrease the size of the lens barrel along the optical axis direction for achieving a low-profile lens barrel.

According to embodiment 1 of the present invention, in addition to the advantageous effect described above, various advantageous effects as the follows can be achieved.

According to embodiment 1, the second retractable lens-retaining frame 21 is connected to the second retractable lens-moving member 22 via a bias member. The bias member is compressed and biases the second retractable lens-retaining frame 21 toward the subject side in the collapsed state and is relaxed in the photographing state; therefore it is possible to determine accurately the position of the second retractable lens-retaining frame 21 with respect to the second retractable lens-moving member 22, and accordingly it is possible to photograph a good image of the subject.

The bias member, in other words the plate spring 33, can decrease the clearance between the first and second retractable lens-retaining frames 11 and 21 and accordingly decrease the dimension of the lens barrel along the optical axis direction in the collapsed state.

Since the first and second retractable lens-retaining frames 11 and 21 are simultaneously retracted with the second retractable lens-retaining frame 21 being pressed along the optical axis direction by the first retractable lens-retaining frame 11, it is possible to decrease further the dimension of the lens barrel along the optical axis direction in the collapsed state.

When the first and second retractable lens-moving members 12 and 22 are retracted, since the second retractable lens-moving member 22 is firstly retracted before the first retractable lens-moving member 12, it is possible to extend the second retractable lens-moving member 22 in the photographing state without interfering with a photographing element 42 formed from for example a CCD area sensor disposed on an imaging surface, or a low-pass filter (LPF) 41 disposed right before the photographing element 42, an image blur suppression mechanism 43, or the other lens groups; and thereafter, the second retractable lens-moving member 22 is configured to move backward along the optical axis direction, it is possible to decrease further the dimension of the lens barrel along the optical axis direction in the collapsed state.

Since the plate spring 33 is used as a bias member in the connection portion of the second retractable lens-retaining frame 21 and the second retractable lens-moving member 22, a compression coil spring, or a tension spring is also preferred. As a result, it is possible to decrease the clearance between the second retractable lens-retaining frame 21 and the second retractable lens-moving member 22 or reduce manufacturing cost.

It is favorable for the first and second retractable lens-moving members 12 and 22 to be accentuated simultaneously when the camera is powered on. Accordingly, it is possible to shorten the time duration to the ready photographing state after the camera is powered on.

Since at least one of the first retractable lens-retaining frame 11 and the first retractable lens-moving member 12, the second retractable lens-retaining frame 21 and the second retractable lens-moving member 22 is integrally formed, it is possible to reduce numbers of parts used and thus reduce manufacturing cost.

According to embodiment 1, the second retractable lens-retaining frame 21 is configured to be movable in the optical axis direction; however it is also favorable that the second retractable lens-moving member 22 be configured movable along the optical axis direction when pressed by the first retractable lens-moving member 12.

The lens barrel according to embodiment 1 can be applied to a camera of any type as a photographing lens barrel to achieve a low-profile camera.

Embodiment 2

Hereinafter, embodiment 2 will be explained in detail with reference to FIGS. 13 to 17.

Figure 13:
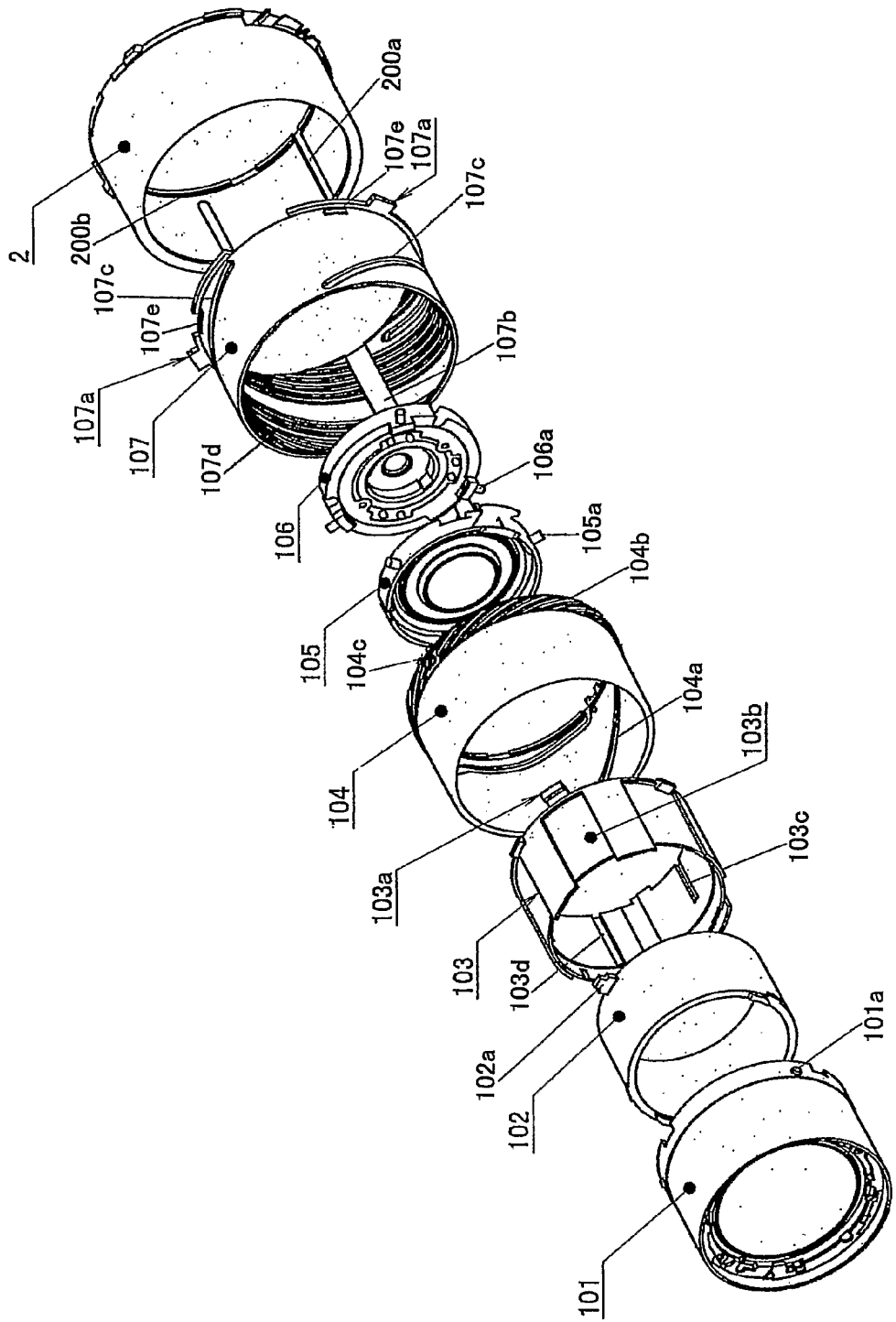
FIG. 13 is an exploded perspective view illustrating an example of a conventional collapsible lens barrel.

FIG. 13 illustrates a conventional collapsible lens barrel. In FIG. 13, a numeral 2 represents the rotatory cylinder which is also described in embodiment 1. The rotatory cylinder 2 is occluded with female helicoids in the support base 1 and thus is moved forward or backward when it is rotated round the optical axis. An inner circumferential surface of the rotatory cylinder 2 is formed with a plurality of rectilinear propagation guiding grooves 200a which are parallel to the optical axis. A rear end portion (imaging surface side) of a first guide tube 107 is integrally formed with a flange portion. A plurality of protrusions 107a extending outward along a radius direction is integrally disposed at the flange portion, functioning as a rectilinear propagation key. The first guide tube 107 is connected to the rotatory cylinder 2 by embedding the plurality of protrusions 107a in the plurality of rectilinear propagation guiding grooves 200a, respectively. As a result, it is possible for the first guide tube 107 to make a rectilinear propagation along the rectilinear propagation guiding grooves 200a in the optical axis direction while a rotation of the first guide tube 107 around the optical axis is prohibited.

An inner circumferential surface of the first guide tube 107 is disposed with a plurality of rectilinear propagation guiding grooves 107b parallel to the optical axis and a plurality of helicoids 107d. An escape groove 107c for a pin 104c which will be described hereinafter is provided in the first guide tube 107 by penetrating the wall thereof.

The helicoids 107d are embedded with helicoids 104b formed at an outer circumferential surface of a rear end portion of a first cam tube 104. Therefore, when being rotated, the first cam tube 104 is guided by the helicoids 107d and 104b to move forward or backward along the optical axis direction.

A plurality of cam grooves 104a is formed at an inner circumferential surface of the first cam tube 104. A first lens group retaining frame 101 is inserted into the first cam tube 104 from a front side. A plurality of pins 104c is disposed as cam followers at the outer circumferential surface of the rear end portion of the first cam tube 104, pointing outward. The plurality of pins 104c penetrates the escape groove 107c disposed at the first guide tube 107 and is embedded in the rectilinear propagation guiding grooves 200a of the rotatory cylinder 2. A plurality of pins 101a is disposed at an outer circumferential surface of a rear end portion of the first lens group retaining frame 101. The plurality of pins 101a is embedded in the plurality of cam grooves 104a respectively.

A second guide tube 103 is inserted into an inner circumferential surface of the first lens group retaining frame 101 from a rear side of the retaining frame 101. The second guide tube 103 has a smaller diameter than the first guide tube 107. A plurality of protrusions 103a is integrally disposed as a rectilinear propagation key at the outer circumferential surface of the second guide tube 103, pointing outward. The plurality of protrusions 103a is embedded in the plurality of rectilinear propagation guiding grooves 107b respectively, thus the second guide tube 103 can not rotate around the optical axis but only make a rectilinear propagation in the optical axis direction.

The outer circumferential surface of the second guide tube 103 is disposed with a plurality of guide grooves 103b extending parallel to the optical axis. The plurality of guide grooves 103b are engaged with a plurality of protrusions not illustrated disposed at the inner circumferential surface of the first lens group retaining frame 101, forcing the first lens group retaining frame 101 to make a rectilinear propagation only.

The inner circumferential surface of the second guide tube 103 is embedded with a second cam tube 102. The second cam tube 102 has a plurality of protrusions 102a formed integrally at an outer circumferential surface of a rear end portion and a plurality of penetrated cam grooves of two types (not illustrated). The plurality of protrusions 102a is fixed at the rear end portion of the first cam tube 104 with appropriate means, such as through embedding, thus the second guide tube 103 is substantially integrated with the first cam tube 104.

An inner circumferential surface of the second cam tube 102 is embedded with a second lens group retaining frame 105 and a shutter unit 106 combined with an aperture at a rear position of the second lens group retaining frame 105. An outer circumferential surface of the second lens group retaining frame 105 is disposed with a plurality of pins 105a as cam followers. The plurality of pins 105a penetrates one type of cam grooves of the second cam tube 102 and is embedded respectively in a plurality of rectilinear propagation guiding grooves 103d formed parallel to the optical axis at the inner circumferential surface of the second guide tube 103. A plurality of pins 106a is disposed at the outer circumferential surface of the shutter unit 106. The plurality of pins 106a penetrates the other type of cam grooves of the second cam tube 102 and is embedded respectively in a plurality of rectilinear propagation guiding grooves 103c formed parallel to the optical axis at the inner circumferential surface of the second guide tube 103.

Hereinafter, operations of the above mentioned conventional collapsible lens barrel will be explained.

The collapsible lens barrel is collapsed or extended to the photographing position with the rotations of the rotatory cylinder 2 driven by a driving motor. When the rotatory cylinder 2 is rotated around the optical axis, the first guide tube 107 which can only make a rectilinear propagation along the rectilinear propagation guiding grooves 200a is moved in the optical axis direction. A plurality of protrusions 107e having a longer length along the circumferential direction is provided at the outer circumferential surface at a rear portion of the first guide tube 107. The plurality of protrusions 107e is embedded in a circumferential groove 200b formed at the inner circumferential surface at a rear portion of the rotatory cylinder 2, providing that the first guide tube 107 can rotate according to the rotations of the rotatory cylinder 2.

Since the plurality of pins 104c of the first cam tube 104 is embedded in the rectilinear propagation guiding grooves 200a of the rotatory cylinder 2, when the rotatory cylinder 2 is rotated, the first cam tube 104 will rotate with the rotatory cylinder 2 at the same speed. Therefore the first cam tube 104 is moved along the optical axis direction, guided by the helicoids 107d and 104b. The second cam tube 102 which is substantially integral to the first cam tube 104 is moved along the optical axis direction, while rotating.

According to the rotation of the first cam tube 104, because of the plurality of pins 101a which is embedded in the plurality of cam grooves 104a respectively and can only make a rectilinear propagation, the first lens group retaining frame 101 is moved along the optical axis direction. According to the rotation of the second cam tube 102, the second lens group retaining frame 105 and shutter unit 106 are moved along the optical axis direction.

Figure 17:
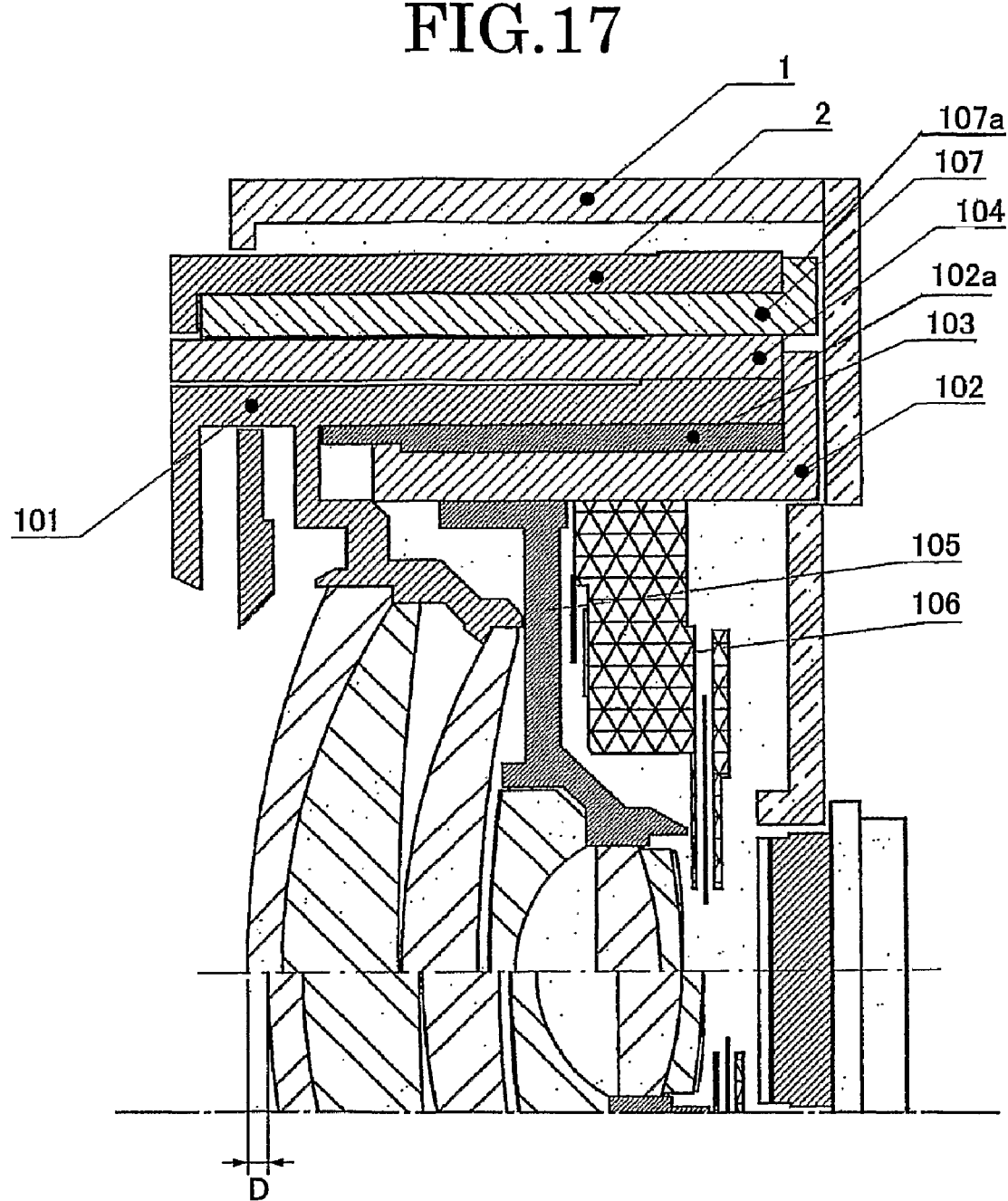
FIG. 17 is a sectional view illustrating a comparison between the lens barrel according to embodiment 2 of the present invention and a conventional lens barrel.

An upper portion of FIG. 17 illustrates that each lens group is collapsed to the collapsed position after the above-mentioned operations. This conventional collapsible lens barrel is designed to have a low-profile by collapsing each member as much as possible. However, since not only the first guide tube 107 and second guide tube 103 but also the flange portions thereof and the protrusions 107a and 103a are integrally formed from plastic, it is necessary to make the flange portions and the protrusions 107a and 103a thicker, in other words, to make the profile of the lens barrel greater along the optical axis. This causes a problem in obtaining a low-profile lens barrel.

Therefore it is proposed that the guide tubes 107 and 103 be made from metal with an aim to make the flange portions and the protrusions 107a and 103a thinner. However, as described above, if the guide tubes 107 and 103 were made by press-molding from metal, it is impossible to obtain a longer guiding length of lens-retaining frame, and the extended length of the lens-retaining frame when the lens barrel is extended from a collapsed state to a photographing state, in other words a moving amount from the extended position to the collapsed position is limited. It also becomes a problem in obtaining a low-profile lens barrel.

Embodiment 2 according to the present invention solved the above-mentioned problem. Hereinafter, Embodiment 2 will be explained in detail, wherein the same numerals are used to refer to the same or identical parts of the conventional collapsible lens barrel illustrated in such as FIG. 13 and descriptions thereof are omitted.

Figure 14:
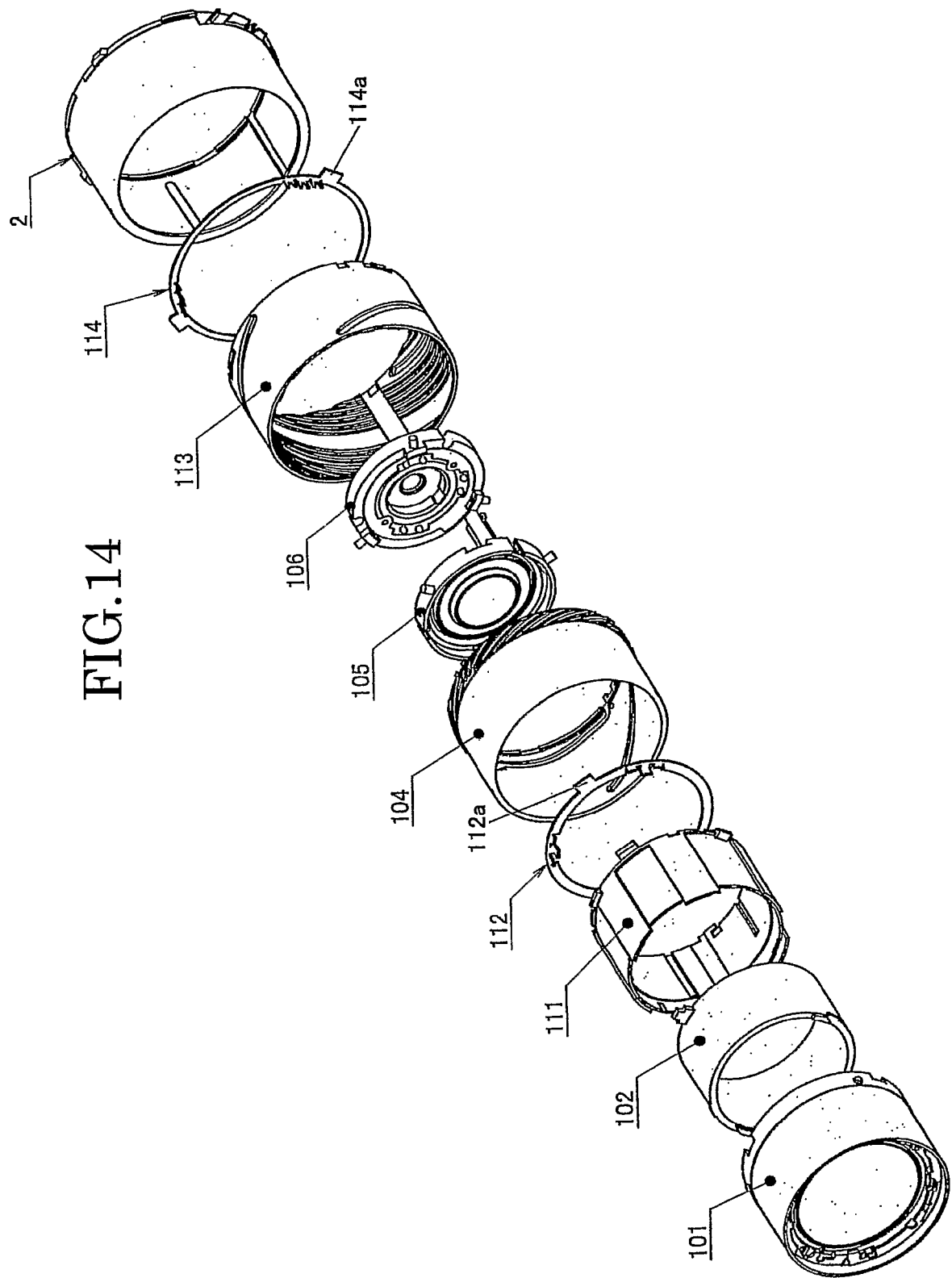
FIG. 14 is an exploded perspective view illustrating a lens barrel according to embodiment 2 of the present invention.

As illustrated in FIG. 14, a numeral 113 refers to a tube body of a first guide tube and a numeral 114 refers to a flange portion of the first guide tube. A numeral 111 represents a tube body of a second guide tube and a numeral 112 refers to a flange portion of the second guide tube. An integration of the first guide tube body 113 and the flange portion 114 constitutes a guide tube corresponding to the first guide tube 107 illustrated in FIG. 13. An integration of the second guide tube body 111 and the flange portion 112 constitutes a guide tube corresponding to the second guide tube 103 illustrated in FIG. 13. The first guide tube body 113 and the second guide tube body 111 can be integrally made from plastic and the flange portion 114 and 112 can be press-molded from metal.

Figure 15:
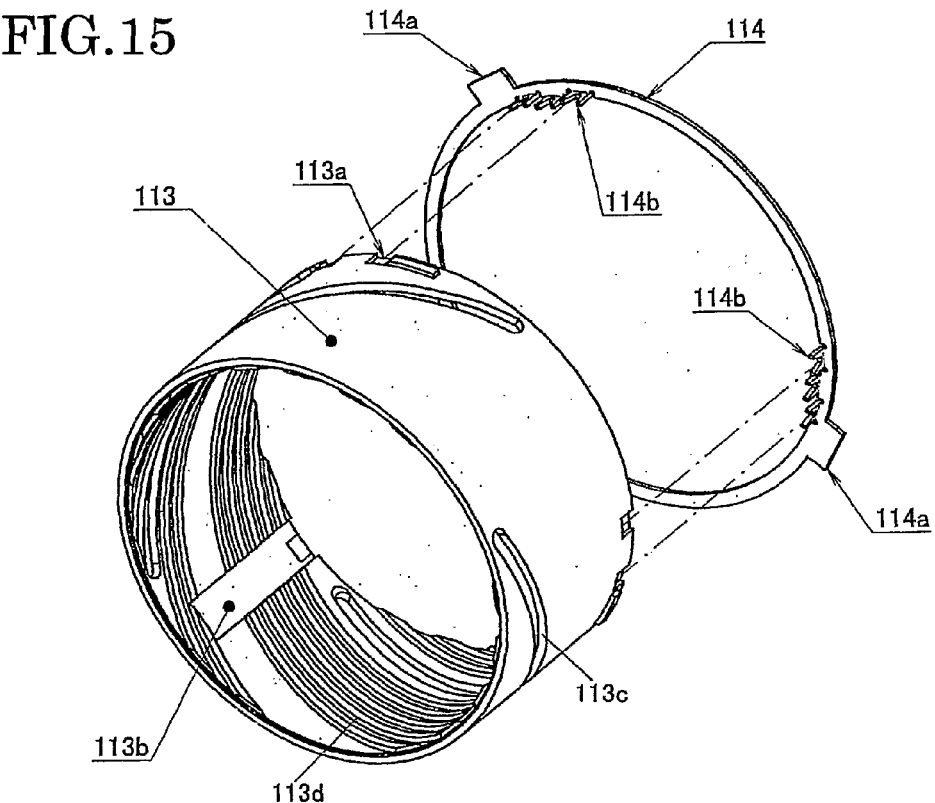
FIG. 15 is an exploded perspective view illustrating a first guide cylinder of the lens barrel according to embodiment 2 of the present invention.

FIG. 15 illustrates the configuration of the first guide tube described above. The first guide tube body 113 is disposed with a plurality of rectilinear propagation guiding grooves 113b, an escape groove 113c and helicoids 113d which are identical to the rectilinear propagation guiding grooves 107b, the escape groove 107c and helicoids 107d which are disposed at the aforementioned first guide tube 107, respectively. The flange portion 114 is disposed with a plurality of protrusions 114a identical to the protrusions 107a of the aforementioned first guide tube 107.

A plurality of concave portions 113a is disposed at both inner and outer circumferential surfaces of the first guide tube body 113 at its rear portion. An inner circumferential end portion of the flange 114 is provided with a plurality of orthogonally bent portions 114b which are bent orthogonally to be parallel to the optical axis direction, formed in plural locations. The orthogonally bent portions 114b are formed in two different stages for embedding in the plurality of concave portions 113a to sandwich the first guide tube body 113. Thus the first guide tube body 113 and the flange portion 114 are combined to form the first guide tube.

Figure 16:
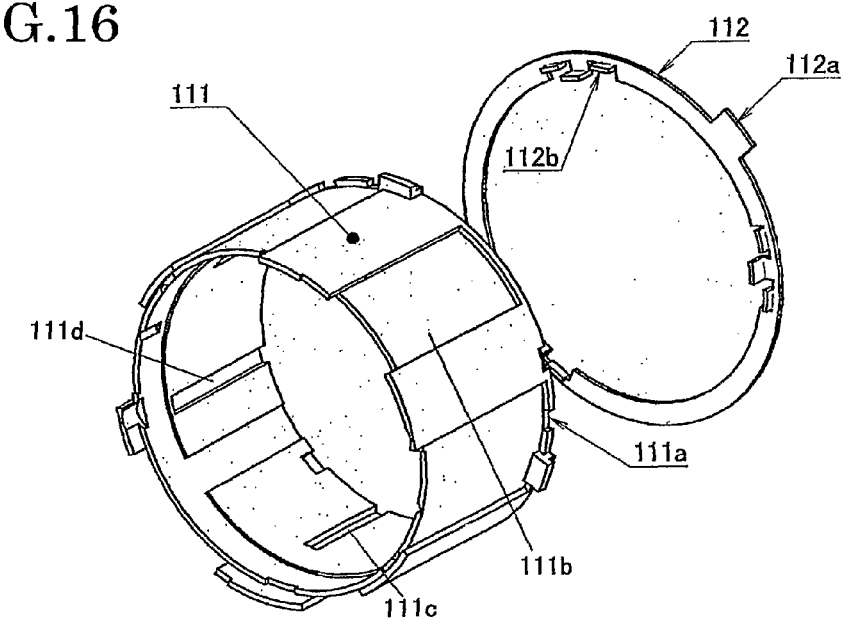
FIG. 16 is an exploded perspective view illustrating a second guide cylinder of the lens barrel according to embodiment 2 of the present invention.

FIG. 16 illustrates the configuration of the second guide tube. The second guide tube body 111 is disposed with a plurality of rectilinear propagation guiding grooves 111b, an escape groove 111c and helicoids 111d which are identical to the rectilinear propagation guiding grooves 103b, the escape groove 103c and helicoids 103d which are disposed at the aforementioned second guide tube 103, respectively. The flange portion 112 is disposed with a plurality of protrusions 112a identical to the protrusions 103a of the aforementioned second guide tube 103.

A plurality of concave portions 111a is disposed at both inner and outer circumferential surfaces of the second guide tube body 111 at its rear portion. An inner circumferential end portion of the flange 114 is provided with a plurality of orthogonally bent portions 114b which are bent orthogonally to be parallel to the optical axis direction, formed in plural locations. The orthogonally bent portions 112b are formed in two different stages for embedding in the plurality of concave portions 111a to sandwich the second guide tube body 111. Thus the second guide tube body 111 and the flange portion 112 are combined to form the second guide tube.

The thus formed first and second guide tubes are incorporated in a similar way to the first guide tube 107 and second guide tube 103 in the conventional example explained according to FIG. 13.

In detail, the plurality of protrusions 104a is embedded in the rectilinear propagation grooves of the support base 1 and functions as a rectilinear propagation key, forcing the first guide tube to move only in the rectilinear propagation direction. The rectilinear propagation guiding grooves 103b are embedded with the protrusions 112a disposed at the flange portion 112 and functions as a rectilinear propagation key, providing that the second guide tube can only move in the rectilinear propagation direction. The plurality of pins 104c penetrates the escape groove 113c and the helicoids 104b are embedded in the helicoids 113d. The plurality of rectilinear propagation guiding grooves 111b is embedded with the protrusions disposed at the inner circumferential surface of the first lens group retaining frame 101, making the first lens group retaining frame 101 move rectilinearly. The plurality of rectilinear propagation guiding grooves 111c and 111d are embedded with pins 105a which penetrate one type of cam grooves formed at the second cam tube 102 and pins 106a of the shutter unit 106.

Since the operations of the lens barrel including the first guide tube and second guide tube are the same as the conventional lens barrel illustrated in FIG. 13, descriptions thereof are omitted.

A lower part of FIG. 17 illustrates a collapsed state of the lens barrel according to Embodiment 2, in other words a retracted state wherein all lens group-retaining frames are retracted to the support base 1.

By comparing the lens barrel according to Embodiment 2 with the conventional lens barrel, it is clear that the axial profile of the lens barrel according to Embodiment 2 is thinner that that of the conventional one. In FIG. 17, the difference between them is indicated with a numeral D.

The difference D is created by forming the guide tube body and flange portion in two separate parts and combining them to constitute the guide tube which is a part of the lens barrel. In other words, each of them is made from an appropriate material adapted well to its functions: for example, the guide tube body is integrally molded from plastic, thus it is easy to form an engaging portion with the adjacent rotatory cylinder and make the guiding length longer and therefore a greater retractable length can be obtained; and the flange portion is made from metal, thus it is possible to make the flange portion thinner and accordingly it is possible to have a greater collapsible space, therefore a low-profile lens barrel can be obtained.

By disposing concave portions at the inner and outer circumferential surface of the guide tube body in plural locations, it is possible to improve relative circularity of the guide tube body and the flange portion and coupling strength between the guide tube body and the flange portion.

Since the flange portion has a plurality of orthogonally bent portions, it is easy to perform the assembling. In detail, the plurality of orthogonally bent portions has elasticity; when the flange portion is assembled to the guide tube body, the plurality of orthogonally bent portions will press the flange portion through the elasticity to make it incorporate with the guide tube body firmly so that the flange portion will not disengage from the guide tube body.

Since the plurality of orthogonally bent portions sandwiches the guide tube body from the inner and outer circumferential surface to incorporate the guide tube body and the flange portion, it is possible to improve the circularity of the guide tube and the strength of the lens barrel even though the guide tube is made with a thinner wall. Since the plurality of orthogonally bent portions is embedded in the concave portions disposed at the guide tube body, thus the thickness of the plurality of orthogonally bent portions is counteracted by the concave portions, and accordingly, the lens barrel can be made smaller in diameter.

In the embodiments there are described the two guide tubes and both of them are made from a separate guide tube body and flange portion; however it is favorable that only one of them be made from a separate guide tube body and flange portion. It is also possible to use only one guide tube formed from a separate guide tube body and flange portion in a lens barrel.

The lens barrel according to embodiment 2 illustrated in FIGS. 14 to 16 can be applied in a camera of any type as a photographing lens barrel to obtain a small-sized and low-profile camera.

The invention claimed is:

1. A lens barrel, comprising:
   a plurality of lens groups;
   a plurality of lens-retaining frames that retain the plurality of lens groups, respectively;
   a lens-retaining frame driving device that drives the plurality of lens-retaining frames and moves at least one of the plurality of lens groups between a collapsed state and a photographing state; and
   a movable lens cylinder that retains therein the plurality of lens-retaining frames,
   wherein the plurality of lens-retaining frames includes:
      a first retractable lens-retaining frame that retains at least one of the plurality of lens groups and retracts to a position located outside an inner radius of the movable lens cylinder in the collapsed state;
      a second retractable lens-retaining frame that retains at least one of the plurality of lens groups and retracts to a position located outside an inner radius of the movable lens cylinder in the collapsed state;
      a first retractable lens-moving member that retains and moves the first retaining frame; and
      a second retractable lens-moving member that retains and moves the second retractable lens-retaining frame,
   wherein at least one of the first and second retractable lens-retaining frames are retained to be movable relative to the respective retractable lens-moving member along an axis parallel to an optical axis direction in the collapsed state, and
   wherein at least one of the first and second retractable lens-retaining frames includes a contact portion which makes at least one of the first and second retractable lens-retaining frames move along the axis parallel to the optical axis direction when the lens-retaining frames contact each other in the collapsed state.

2. The lens barrel as claimed in claim 1, wherein the contact portion is a protruding element formed on at least one of the first and second retractable lens-retaining frames.

3. The lens barrel as claimed in claim 1, wherein one of the first and second retractable lens-retaining frames is connected with the respective retractable lens-moving member via a bias member.

4. The lens barrel as claimed in claim 3, wherein the bias member is compressed and biases the one of the first and second retractable lens-retaining frames toward an object side in the collapsed state and the bias member is relaxed in the photographing state.

5. The lens barrel as claimed in claim 3, wherein the bias member is a leaf spring.

6. The lens barrel as claimed in claim 3, wherein the bias member is a compression spring.

7. The lens barrel as claimed in claim 3, wherein the bias member is a tension spring.

8. The lens barrel as claimed in claim 1, wherein the first and second retractable lens-retaining frames contact each other in moving from the photographing state to the collapsed state and are collapsed simultaneously by maintaining contact.

9. The lens barrel as claimed in claim 1, wherein one of the first and second retractable lens-retaining frames is firstly retracted away from the optical axis, then an other of the first and second retractable lens-retaining frames is retracted from the optical axis and pushes the firstly retracted retractable lens-retaining frame to move along the axis parallel to the optical axis direction in the collapsed state.

10. The lens barrel as claimed in claim 1, wherein the first and second retractable lens-moving members have respectively a position detection device to detect whether the first and second retractable lens-moving members have been collapsed to the collapsed state; and the plurality of lens groups other than the first and second retractable lens groups are collapsed when the first and second retractable lens-moving members are detected by the respective position detection device to have been collapsed to the collapsed state.

11. The lens barrel as claimed in claim 1, wherein the first and second retractable lens-moving members are actuated simultaneously.

12. The lens barrel as claimed in claim 1, wherein one of the first and second retractable lens-moving members is firstly actuated and an other of the first and second retractable lens-retaining frames is actuated after a determined number of pulses or time is detected.

13. A camera comprising the lens barrel as claimed in claim 1.

14. The lens barrel as claimed in claim 1, wherein the first retractable lens-retaining frame and the first retractable lens-moving member are integrally formed.

15. The lens barrel as claimed in claim 1, wherein the second retractable lens-retaining frame and the second retractable lens-moving member are integrally formed.

* * * * *